(12) United States Patent
Mathur et al.

(10) Patent No.: US 12,711,089 B2
(45) Date of Patent: Aug. 18, 2026

(54) DATA-VALID WINDOW TRACKING FOR HIGH SPEED INTERFACE

(71) Applicant: Sandisk Technologies, Inc., Milpitas, CA (US)

(72) Inventors: Shiv Mathur, Bangalore (IN); Sajal Mittal, Bangalore (IN); Jayanth Thimmaiah, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 71 days.

(21) Appl. No.: 18/679,470

(22) Filed: May 31, 2024

(65) Prior Publication Data

US 2025/0370950 A1 Dec. 4, 2025

Related U.S. Application Data

(60) Provisional application No. 63/590,046, filed on Oct. 13, 2023.

(51) Int. Cl.
*G06F 13/40* (2006.01)

(52) U.S. Cl.
CPC ................................ *G06F 13/4068* (2013.01)

(58) Field of Classification Search
CPC .................................................. G06F 13/4068
USPC ........................................................ 710/104
See application file for complete search history.

(56) References Cited

U.S. PATENT DOCUMENTS

| | | | | |
|---|---|---|---|---|
| 9,640,277 | B2 | 5/2017 | Bonen et al. | |
| 10,997,114 | B2 * | 5/2021 | Mishra | G06F 13/4291 |
| 11,127,438 | B1 | 9/2021 | Marom et al. | |
| 11,200,928 | B2 | 12/2021 | Chae et al. | |
| 11,430,494 | B2 * | 8/2022 | Li | G11C 11/4076 |
| 2021/0334028 | A1 * | 10/2021 | Ellis | G06F 3/0604 |
| 2023/0368825 | A1 | 11/2023 | Hwang | |
| 2024/0154718 | A1 * | 5/2024 | Cline | H04L 1/0029 |

OTHER PUBLICATIONS

Jedec, "Jedec Standard—NAND Flash Interface Interoperability," JESD230D, Jun. 2019, 78 pages.

* cited by examiner

*Primary Examiner* — Pierre Vital
(74) *Attorney, Agent, or Firm* — Pearl Cohen LLP

(57) ABSTRACT

An apparatus includes one or more control circuit configured to connect to a data bus. The one or more control circuit is configured to compare a first bit sampled on a first side of a Data Valid Window (DVW) of a data signal with a middle bit from the middle of the DVW and compare a second bit sampled on a second side of the DVW with the middle bit to detect misalignment of sampling with the DVW. The one or more control circuit is configured to adjust sampling times for the data signal according to detection of misalignment.

18 Claims, 23 Drawing Sheets

120
Host
122
Host Processor
124
Host Memory
128
126
PCIe Interface
130
100
102
Controller
104
Memory Packages
BEP
112
FEP
110
DDR
106
DRAM/ ReRAM
SSD 110
PCIe Interface to Host
150
Host Processor
152
NOC
154
Memory Processor
156
SRAM
160
DRAM Controller
162
PCIe Interface
164
PCIe Interface
166

Figure 1C:
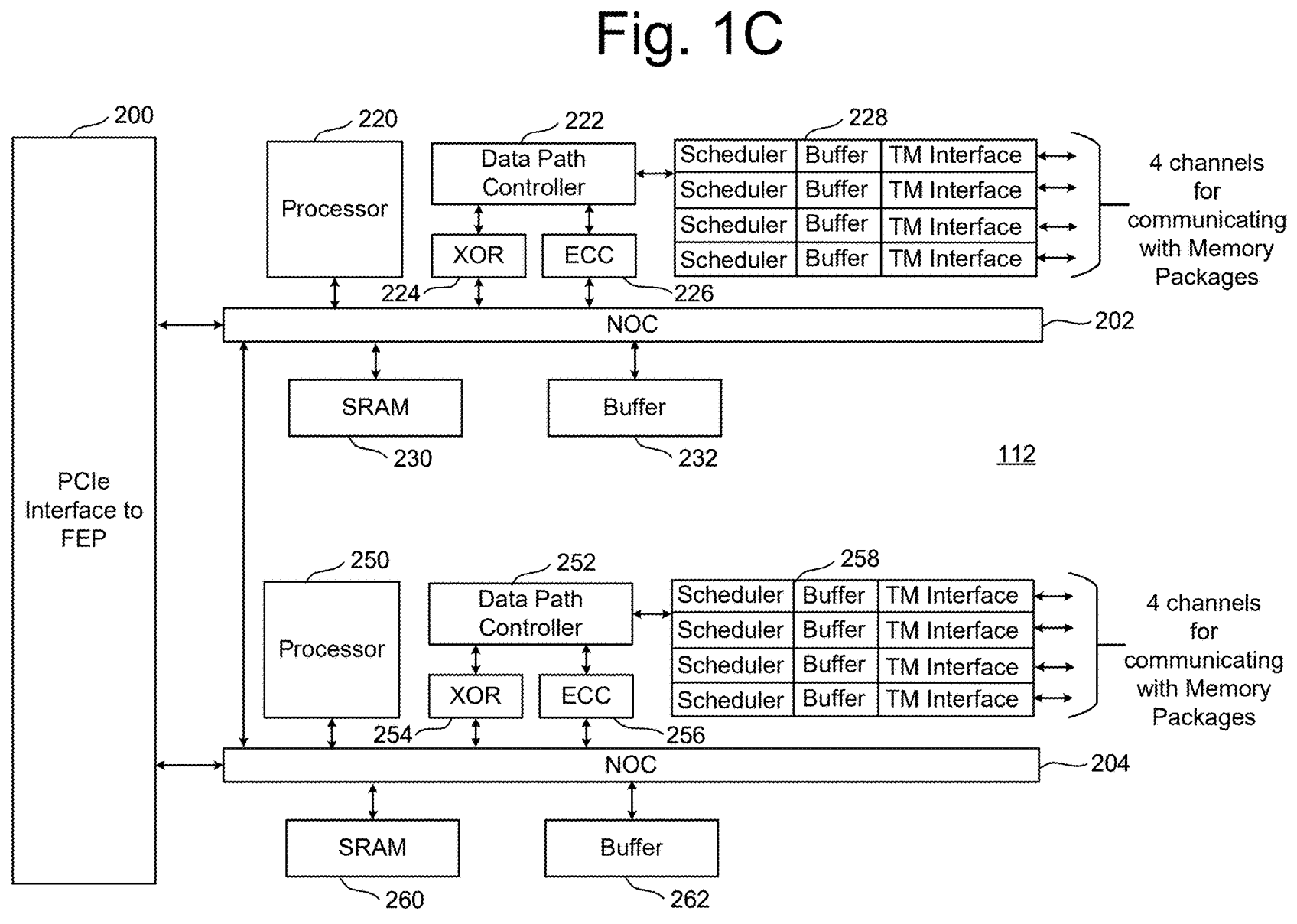

200
PCIe Interface to FEP

202
NOC

220
Processor

222
Data Path Controller

224
XOR

226
ECC

228
Scheduler Buffer TM Interface
Scheduler Buffer TM Interface
Scheduler Buffer TM Interface
Scheduler Buffer TM Interface 4 channels for communicating with Memory Packages

230
SRAM

232
Buffer

204
NOC

250
Processor

252
Data Path Controller

254
XOR

256
ECC

258
Scheduler Buffer TM Interface
Scheduler Buffer TM Interface
Scheduler Buffer TM Interface
Scheduler Buffer TM Interface 4 channels for communicating with Memory Packages

260
SRAM

262
Buffer 104
memory bus (data lines and chip enable lines)
294
Memory Die
300
Memory Die
300
Memory Die
300
Memory Die
300
TM Interface
296

307
311
System Control Logic
360
State Machine
312
Power Control
316
Storage
366
Memory Interface
368
row address signals
control signals
row decoder
324
array drivers
374
block select
376
row control circuitry 320
control signals
column control circuitry 364
column decoder
332
driver circuitry
372
block select
373
Sense Block(s)
350
column address signals
Control Die
host
308
301
370
memory array
326

Fig. 4 t0
t1
DVW
Voltage
510
F F F
PL5
PL3
PL1
PR1
PR3
PR5
F F F
F1
PL4
PL2
PC
PR2
PR4
F2
Time 620a
620b
620c
Byte 0
Byte 1
Byte 2
F1
PC
F2

620a
620d
620e
Byte 0
Byte 1
Byte 2
PL5
PC
PR5

620a
620d
620e
Byte 0
Byte 1
Byte 2
PL5
PC
PR5

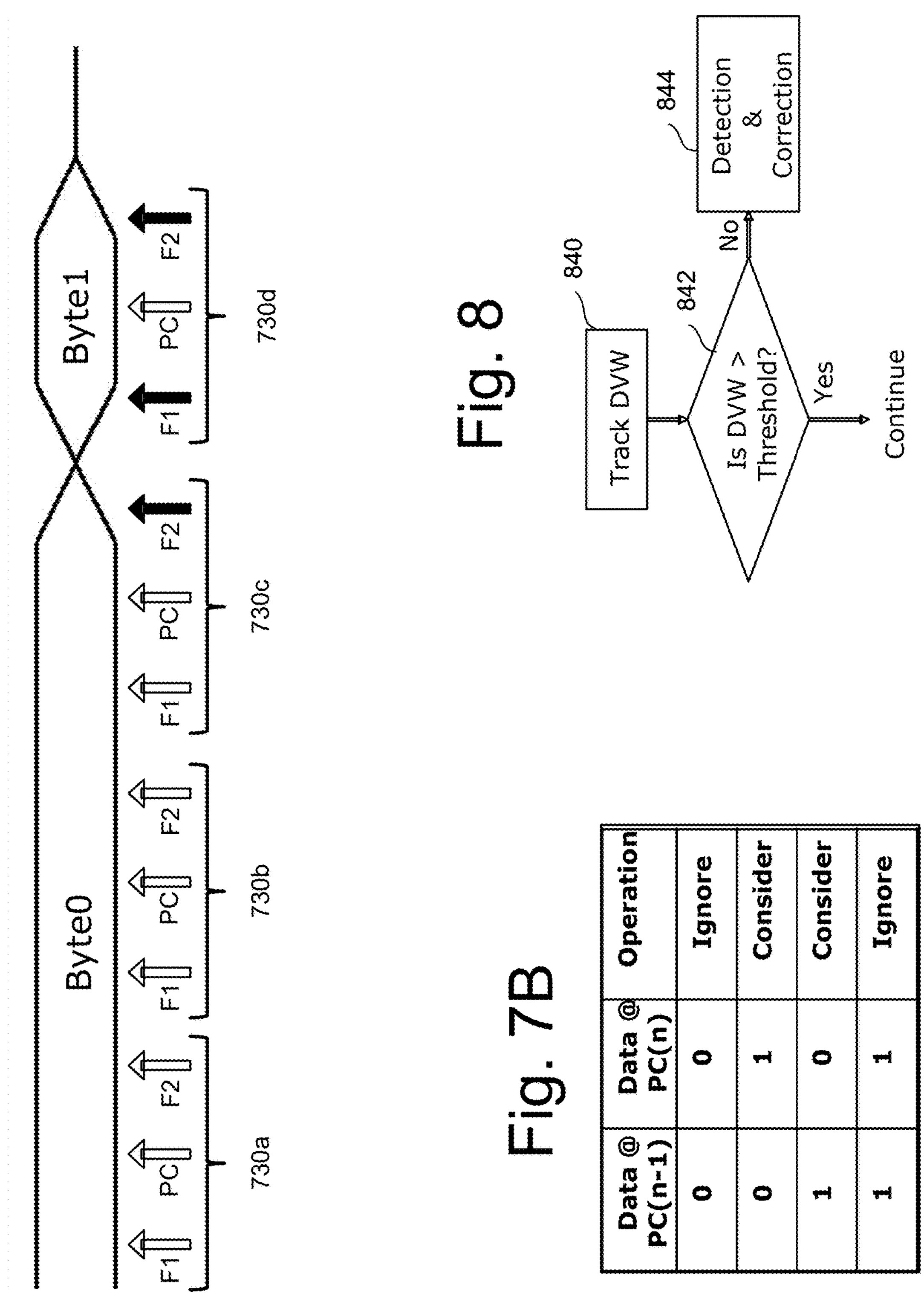
| Data @ PC(n-1) | Data @ PC(n) | Operation |
|---|---|---|
| 0 | 0 | Ignore |
| 0 | 1 | Consider |
| 1 | 0 | Consider |
| 1 | 1 | Ignore |

950
970
Left-Shift Register
958
Sampler
IOx
964
966
968
XNOR
Binary Counter for N cycles
If MSB bit = 1
FLG=1
Sampler
952
0=Ignore
F1(n)
960
Sampler
980
AND
Error
PC(n-1)
XOR
1
Sampler
954
972
974
976
XNOR
Binary Counter for N cycles
If MSB bit = 1
FLG=1
956
PC(n)
962
PC(n)
Sampler
F2(n)
978
Right-Shift Register Nonvolatile memory Die 1002
Registers 1004
DVW tracking and adjustment 950a
1008
1010
1012
DVW tracking and adjustment 950b
I/O circuit 1006
Memory controller Die 404

P2
P3
1154
Flag=1 if MSB bit = 1
1156
Flag=1 if MSB bit=1
1162
1158
1160
Sampling unchanged
No
Is Flag =1?
No
Is Flag =1?
Yes
Yes
1166
1164
Shifting PC/F1/F2 to left
Shifting PC/F1/F2 to right
1170
1168
1169
1171
Restoring Pointers
Yes
ECC Fail?
No
No
ECC Fail?
Yes
Restoring Pointers
1172
Repetitive Checker
1174
Yes
Repetitive?
No
P4
Stop

Fig. 12C

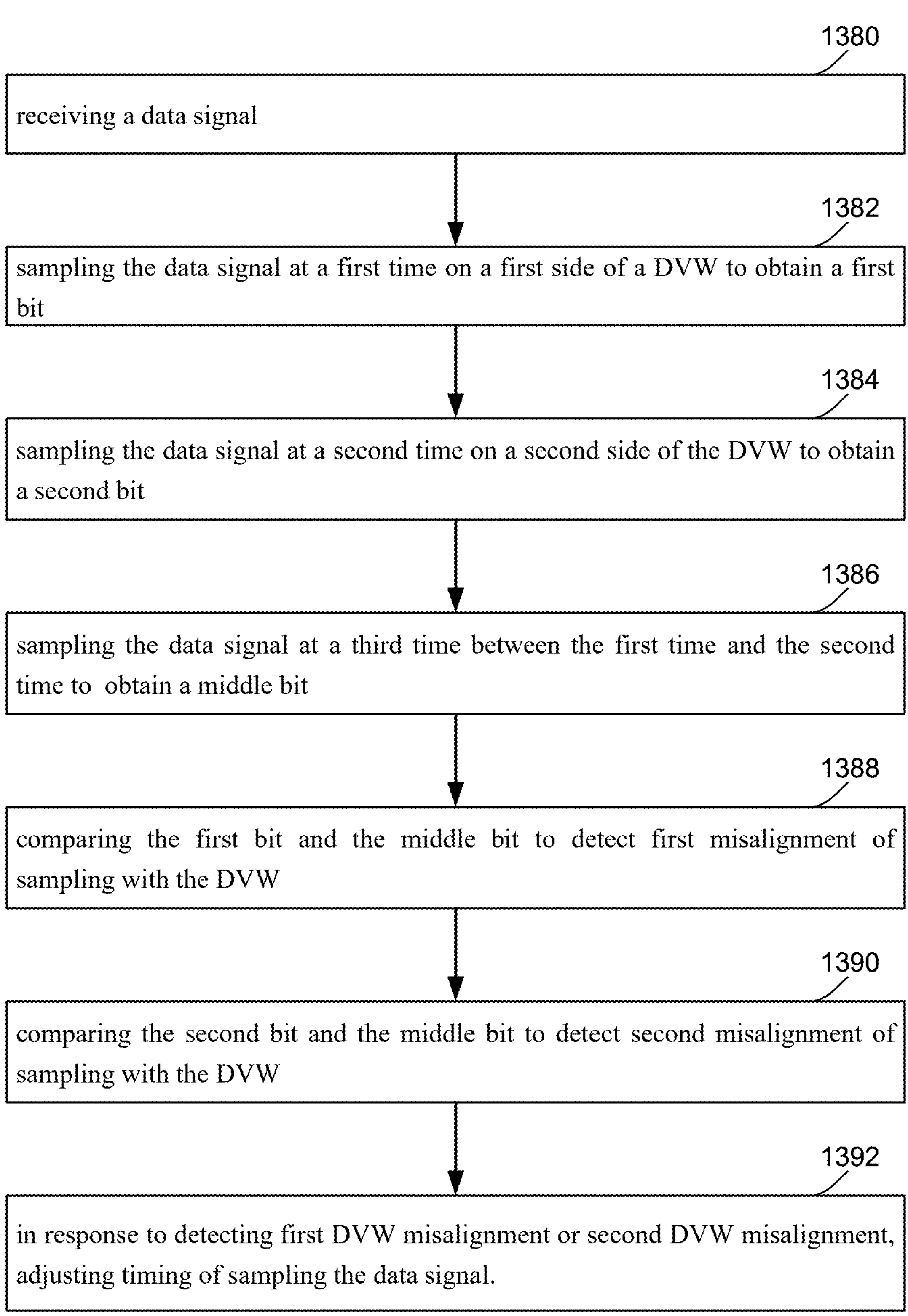
Fig. 13
1380
receiving a data signal
1382
sampling the data signal at a first time on a first side of a DVW to obtain a first bit
1384
sampling the data signal at a second time on a second side of the DVW to obtain a second bit
1386
sampling the data signal at a third time between the first time and the second time to obtain a middle bit
1388
comparing the first bit and the middle bit to detect first misalignment of sampling with the DVW
1390
comparing the second bit and the middle bit to detect second misalignment of sampling with the DVW
1392
in response to detecting first DVW misalignment or second DVW misalignment, adjusting timing of sampling the data signal.

DATA-VALID WINDOW TRACKING FOR HIGH SPEED INTERFACE

CROSS-REFERENCE TO RELATED APPLICATIONS

The present application claims the benefit of U.S. Patent Application No. 63/590,046, filed on Oct. 13, 2023, which is incorporated herein by reference in its entirety.

BACKGROUND

The present technology relates to nonvolatile memories.

Semiconductor memory devices have become more popular for use in various electronic devices. For example, non-volatile semiconductor memory is used in cellular telephones, digital cameras, personal digital assistants, mobile computing devices, non-mobile computing devices and other devices (host devices).

A memory device includes memory cells, which may be arranged in series, in NAND strings, for instance, where select gate transistors are provided at the ends of the NAND string to selectively connect a channel of the NAND string to a source line or bit line. A charge-storing material such as a floating gate or a charge-trapping material can be used in such memory devices to store a charge which represents a data state.

A memory system may include a memory controller die and one or more nonvolatile memory die host that may be connected by an interface that includes a data bus to allow data to be transferred to memory die(s) for storage and from memory die(s) for subsequent access. Efficiently maintaining high throughput communication through such an interface may be challenging.

BRIEF DESCRIPTION OF THE DRAWINGS

Like-numbered elements refer to common components in the different Figures (Figs).

FIG. 1C is a block diagram of one embodiment of a Back End Processor Circuit. In some embodiments, the Back End Processor Circuit is part of a Controller.

FIG. 4 shows an example of a memory system that includes a memory controller die connected to memory dies.

FIGS. 7A-B show examples of transitions between bits.

FIG. 8 shows a method of selectively initiating detection and correction.

FIGS. 12A-C show an example of a method of DVW tracking and adjustment applied to data received by a nonvolatile memory die (write data).

FIG. 13 shows an example of a method that includes detecting misalignment of sampling with DVWs and adjusting timing in response.

DETAILED DESCRIPTION

The technology described herein includes control circuits connected to a data bus (e.g., data bus between a memory controller and non-volatile memory dies in a memory system) to enable on-the-fly Data-Valid Window (DVW) tracking. Pointers (sampling times) for DVW tracking may be obtained from sampling at different sampling times across a DVW to locate boundaries of the DVW (e.g., in an initial training). Pointers at each side and in the middle of DVWs are then used to track DVW drift on-the-fly (e.g., without interrupting data transfer for a training operation). A left-side bit and right-side bit may be compared with a middle bit of a DVW and the results may indicate leftward drift or rightward drift. If DVW drift (shift) is detected, appropriate adjustment may be performed to improve alignment of sampling times with DVWs. For example, where DVWs have shifted left, sampling times (pointers) may be shifted left accordingly. Where DVWs have shifted right, sampling times may be shifted right accordingly.

In a memory system, DVW tracking and adjustment may be implemented on one or both sides of a data bus between a memory controller die and a nonvolatile memory die. DVW tracking and adjustment may be selectively applied (e.g., applied in response to some indication that DVW drift may have occurred).

Figure 1A:
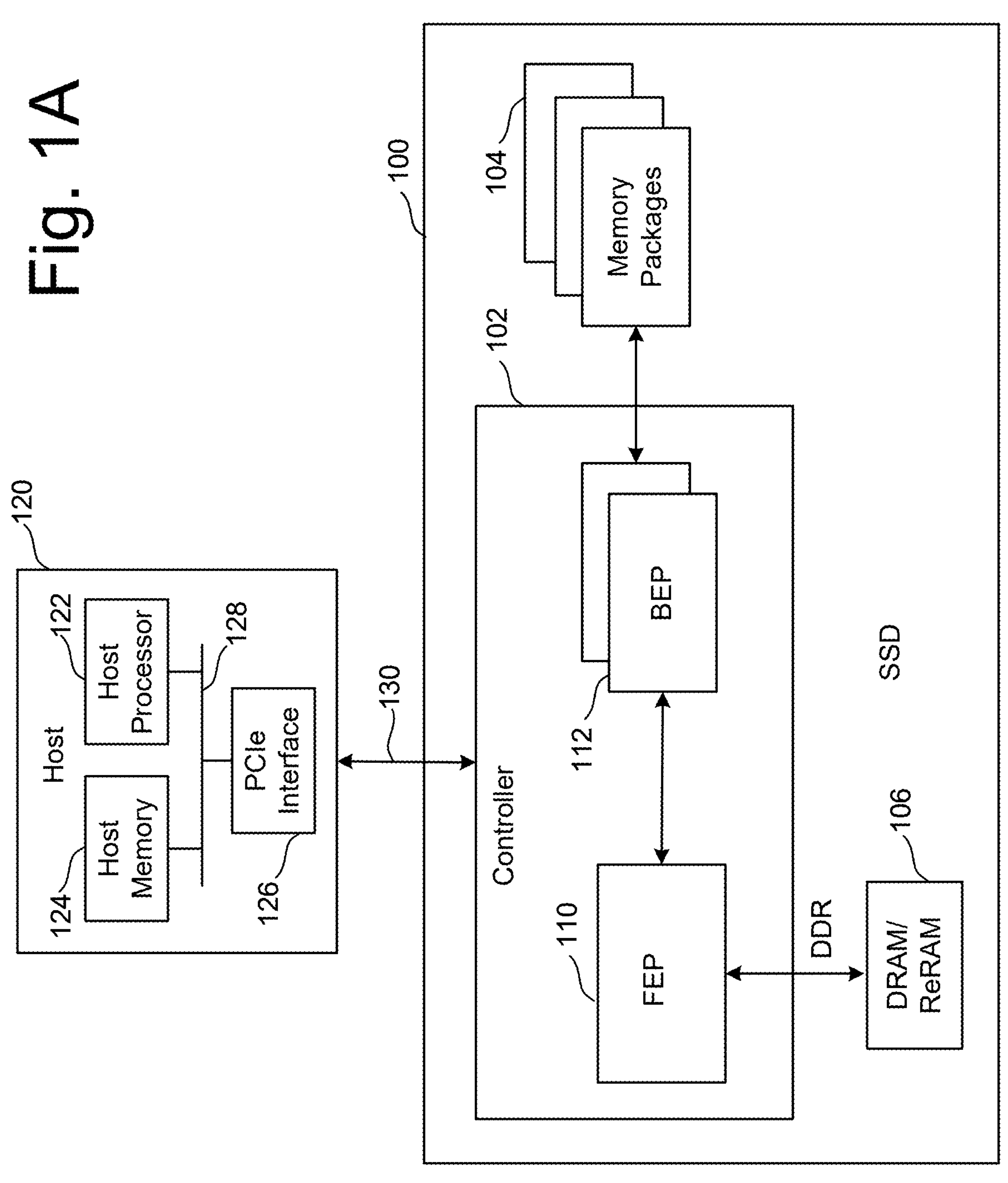
FIG. 1A is a block diagram of one embodiment of a memory system connected to a host.

FIG. 1A is a block diagram of one embodiment of a memory system 100 (data storage system) connected to a host 120. Memory system 100 can be configured to implement aspects of the technology proposed herein. Many different types of memory systems can be used with the technology proposed herein. One example memory system is a solid-state drive ("SSD"); another is a memory card; however, other types of memory systems can also be used. Memory system 100 comprises a Controller 102, nonvolatile memory 104 for storing data, and local memory (e.g., DRAM/ReRAM) 106. Controller 102 comprises a Front-End Processor Circuit (FEP) 110 and one or more Back End Processor Circuits (BEP) 112. In one embodiment FEP circuit 110 is implemented on an ASIC. In one embodiment, each BEP circuit 112 is implemented on a separate ASIC. The ASICs for each of the BEP circuits 112 and the FEP circuit 110 are implemented on the same semiconductor such that the Controller 102 is manufactured as a System on a Chip ("SoC"). FEP 110 and BEP 112 both include their own processors. In one embodiment, FEP circuit 110 and BEP 112 work as a master slave configuration where the FEP circuit 110 is the master, and each BEP 112 is a slave. For example, FEP circuit 110 implements a flash translation layer that performs memory management (e.g., garbage collection, wear leveling, etc.), logical to physical address translation, communication with the host, management of DRAM (local volatile memory) and management of the overall operation of the SSD (or other nonvolatile data storage system). The BEP circuit 112 manages memory operations in the memory packages/die at the request of FEP circuit 110. For example, the BEP circuit 112 can carry out the read, erase and programming processes. Additionally, the BEP circuit 112 can perform buffer management, set specific voltage levels required by the FEP circuit 110, perform error correction (ECC), control the Toggle Mode interfaces to the memory packages, etc. In one embodiment, each BEP circuit 112 is responsible for its own set of memory packages. Controller 102 is one example of a control circuit.

In one embodiment, nonvolatile memory 104 comprises a plurality of memory packages. Each memory package includes one or more memory die. Therefore, Controller 102 is connected to one or more nonvolatile memory die. In one embodiment, each memory die in the memory packages 104 utilize NAND flash memory (including two-dimensional NAND flash memory and/or three-dimensional NAND flash memory). In other embodiments, the memory package can include other types of memory.

Controller 102 communicates with host 120 via an interface 130. For example, interface 130 may be configured according to a standard such as the Secure Digital (SD) standard and/or the NonVolatile Memory express (NVMe) standard (e.g., using PCI Express (PCIe)). For working with memory system 100, host 120 includes a host processor 122, host memory 124, and in this example a PCIe interface 126 connected to bus 128. Host memory 124 is the host's physical memory, and can be DRAM, SRAM, nonvolatile memory or another type of storage. Host 120 is external to and separate from memory system 100. In one embodiment, memory system 100 is embedded in host 120.

In some cases, a data storage system (e.g., memory system 100) may support communication with hosts that use two or more different interface standards in order to be compatible with a wide range of hosts (e.g., backward compatible). Such a dual interface data storage system (or multi-mode system) may have circuits configured to comply with two or more standards. For example, a memory system (e.g., SD express) may be configured to communicate via the NVMe standard as shown in FIG. 1A and may also be configurable to communicate with a host using an SD interface (e.g., an interface that complies with the SD interface specification). This may allow a memory system to be compatible with a wide range of hosts.

Figure 1B:
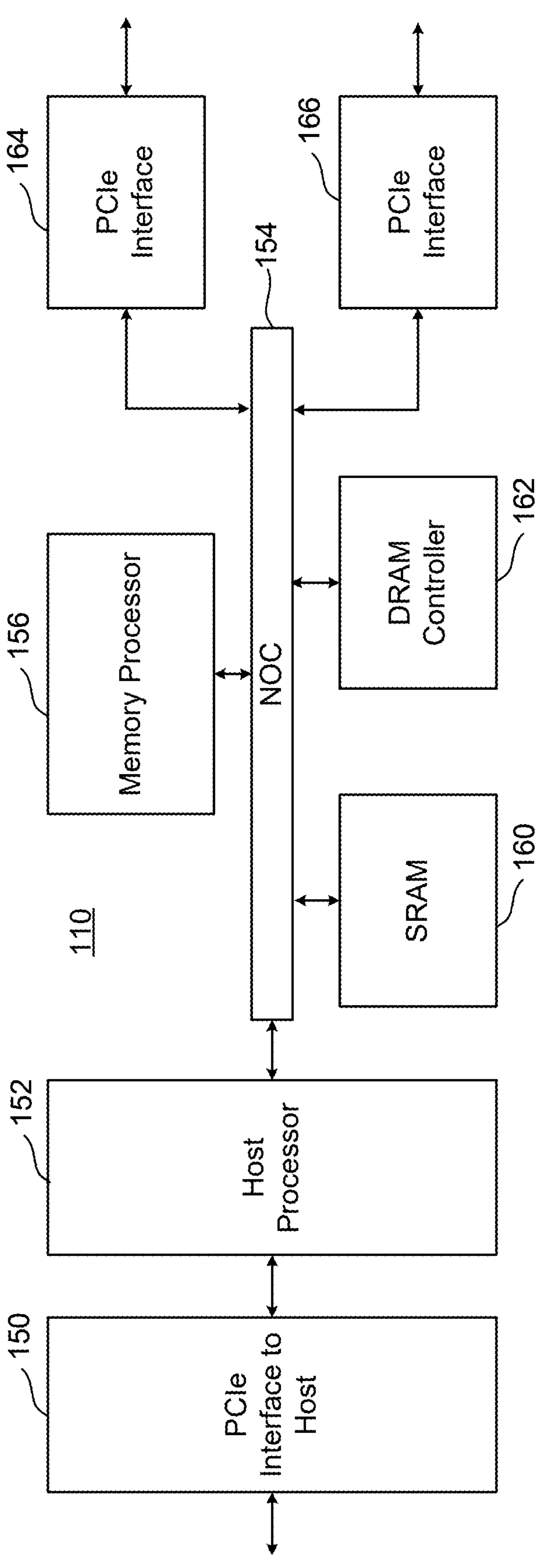
FIG. 1B is a block diagram of one embodiment of a Front-End Processor Circuit. In some embodiments, the Front-End Processor Circuit is part of a Controller.

FIG. 1B is a block diagram of one embodiment of FEP circuit 110. FIG. 1B shows a PCIe interface 150 to communicate with host 120 and a host processor 152 in communication with that PCIe interface. The host processor 152 can be any type of processor known in the art that is suitable for the implementation. Host processor 152 is in communication with a network-on-chip (NOC) 154. A NOC is a communication subsystem on an integrated circuit, typically between cores in a SoC. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). Connected to and in communication with NOC 154 is the memory processor 156, SRAM 160 and a DRAM controller 162. The DRAM controller 162 is used to operate and communicate with the DRAM (e.g., DRAM 106). SRAM 160 is local RAM memory used by memory processor 156. Memory processor 156 is used to run the FEP circuit and perform the various memory operations. Also in communication with the NOC are two PCIe Interfaces 164 and 166. In the embodiment of FIG. 1B, the SSD controller will include two BEP circuits 112; therefore, there are two PCIe Interfaces 164/166. Each PCIe Interface communicates with one of the BEP circuits 112. In other embodiments, there can be more or less than two BEP circuits 112; therefore, there can be more than two PCIe Interfaces.

FIG. 1C is a block diagram of one embodiment of the BEP circuit 112. FIG. 1C shows a PCIe Interface 200 for communicating with the FEP circuit 110 (e.g., communicating with one of PCIe Interfaces 164 and 166 of FIG. 1B). PCIe Interface 200 is in communication with two NOCs 202 and 204. In one embodiment the two NOCs can be combined to one large NOC. Each NOC (202/204) is connected to SRAM (230/260), a buffer (232/262), processor (220/250), and a data path controller (222/252) via an XOR engine (224/254) and an ECC engine (226/256). The ECC engines 226/256 are used to perform error correction, as known in the art. The XOR engines 224/254 are used to XOR the data so that data can be combined and stored in a manner that can be recovered in case there is a programming or read error. Data path controller 22 is connected to an interface module for communicating via four channels with memory packages. Thus, the top NOC 202 is associated with an interface 228 for four channels for communicating with memory packages and the bottom NOC 204 is associated with an interface 258 for four additional channels for communicating with memory packages. Each interface 228/258 includes four Toggle Mode interfaces (TM Interface), four buffers and four schedulers. There is one scheduler, buffer and TM Interface for each of the channels. The processor can be any standard processor known in the art. The data path controllers 222/252 can be a processor, FPGA, microprocessor or other type of controller. The XOR engines 224/254 and ECC engines 226/256 are dedicated hardware circuits, known as hardware accelerators. In other embodiments, the XOR engines 224/254 and ECC engines 226/256 can be implemented in software. The scheduler, buffer, and TM Interfaces are hardware circuits.

Figure 1D:
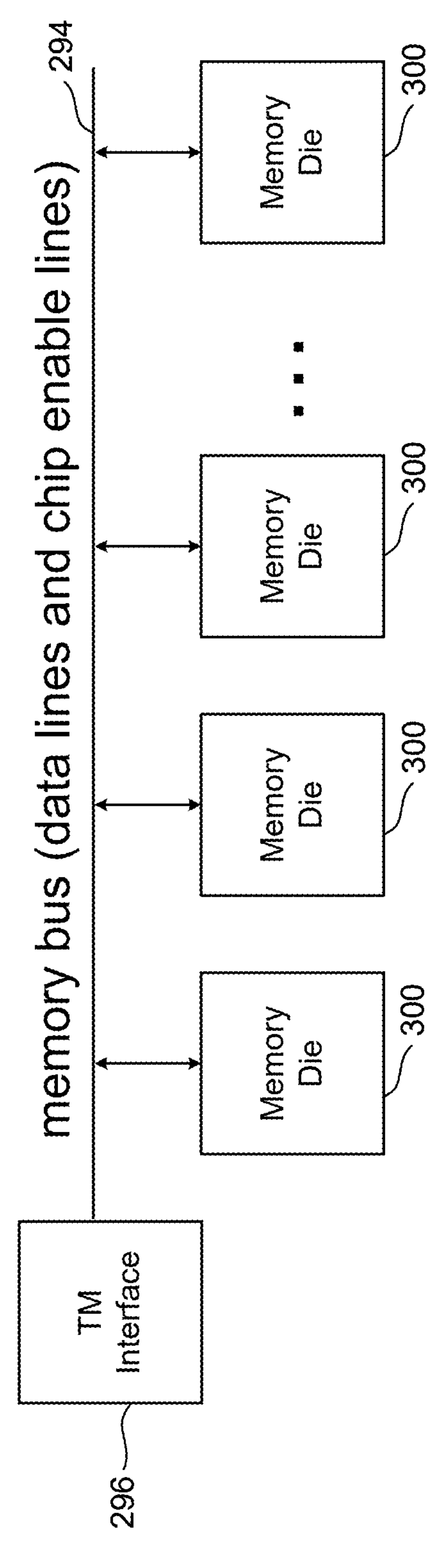
FIG. 1D is a block diagram of one embodiment of a memory package.

FIG. 1D is a block diagram of one embodiment of a memory package 104 that includes a plurality of memory die 300 connected to a memory bus 294 (data lines and chip enable lines). The memory bus 294 connects to a Toggle Mode Interface 296 for communicating with the TM Interface of a BEP circuit 112 (see e.g., FIG. 1C). In some embodiments, the memory package can include a small controller connected to the memory bus and the TM Interface. The memory package can have one or more memory die. In one embodiment, each memory package includes eight or 16 memory die; however, other numbers of memory die can also be implemented. The technology described herein is not limited to any particular number of memory die.

Figure 2A:
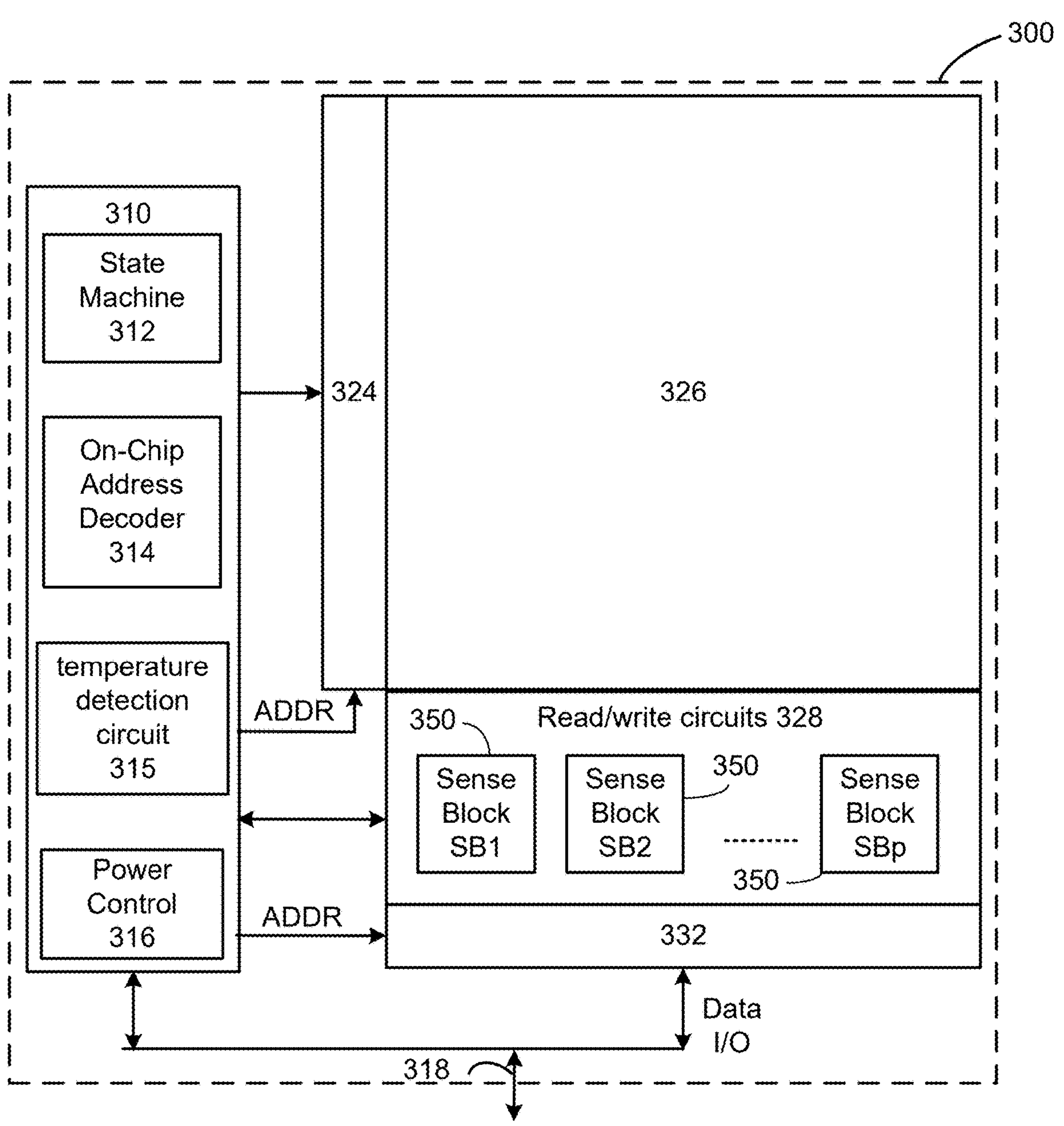
FIG. 2A is a functional block diagram of an embodiment of a memory die.

FIG. 2A is a functional block diagram of one embodiment of a memory die 300. Each of the one or more memory die 300 of FIG. 1D can be implemented as memory die 300 of FIG. 2A. The components depicted in FIG. 2A are electrical circuits. In one embodiment, each memory die 300 includes a memory structure 326, control circuits 310, and read/write circuits 328, all of which are electrical circuits. Memory structure 326 is addressable by word lines via a row decoder 324 and by bit lines via a column decoder 332. The read/write circuits 328 include multiple sense blocks 350 including SB1, SB2, . . . , SBp (sensing circuits) and allow a page (or multiple pages) of data in multiple memory cells to be read or programmed in parallel. In one embodiment, each sense block includes a sense amplifier and a set of latches connected to the bit line. The latches store data to be written and/or data that has been read. The sense blocks include bit line drivers.

Commands and data are transferred between the controller and the memory die 300 via lines 318, which may form a bus between memory die 300 and the controller (e.g., memory bus 294). In one embodiment, memory die 300 includes a set of input and/or output (I/O) pins that connect to lines 318.

Control circuits 310 cooperate with the read/write circuits 328 to perform memory operations (e.g., write, read, erase, and others) on memory structure 326. In one embodiment, control circuits 310 includes a state machine 312, an on-chip address decoder 314, a power control module 316 (power control circuit) and a temperature detection circuit 315. State machine 312 provides die-level control of memory operations. In one embodiment, state machine 312 is programmable by software. In other embodiments, state machine 312 does not use software and is completely implemented in hardware (e.g., electrical circuits). In some embodiments, state machine 312 can be replaced by a microcontroller or microprocessor. In one embodiment, control circuits 310 include buffers such as registers, ROM fuses and other storage devices for storing default values such as base voltages and other parameters.

The on-chip address decoder 314 provides an address interface between addresses used by controller 102 to the hardware address used by the decoders 324 and 332 (e.g., logical-to-physical address translation). Power control module 316 controls the power and voltages supplied to the word lines and bit lines during memory operations. Power control module 316 may include charge pumps for creating voltages.

In one embodiment, memory structure 326 comprises a monolithic three-dimensional memory array of nonvolatile memory cells in which multiple memory levels are formed above a single substrate, such as a wafer. The memory structure may comprise any type of nonvolatile memory that is monolithically formed in one or more physical levels of arrays of memory cells having an active area disposed above a silicon (or other type of) substrate. In one example, the nonvolatile memory cells of memory structure 326 comprise vertical NAND strings with charge-trapping material such as described, for example, in U.S. Pat. No. 9,721,662, incorporated herein by reference in its entirety. In another embodiment, memory structure 326 comprises a two-dimensional memory array of nonvolatile memory cells. In one example, the nonvolatile memory cells are NAND flash memory cells utilizing floating gates such as described, for example, in U.S. Pat. No. 9,082,502, incorporated herein by reference in its entirety. Other types of memory cells (e.g., NOR-type flash memory) can also be used.

In one embodiment, the control circuit(s) (e.g., control circuits 310) are formed on a first die, referred to as a control die, and the memory array (e.g., memory structure 326) is formed on a second die, referred to as a memory die. For example, some or all control circuits (e.g., control circuit 310, row decoder 324, column decoder 332, and read/write circuits 328) associated with a memory may be formed on the same control die. A control die may be bonded to one or more corresponding memory die to form an integrated memory assembly. The control die and the memory die may have bond pads arranged for electrical connection to each other. Bond pads of the control die and the memory die may be aligned and bonded together by any of a variety of bonding techniques, depending in part on bond pad size and bond pad spacing (i.e., bond pad pitch). In some embodiments, the bond pads are bonded directly to each other, without solder or other added material, in a so-called Cu-to-Cu bonding process. In some examples, dies are bonded in a one-to-one arrangement (e.g., one control die to one memory die). In some examples, there may be more than one control die and/or more than one memory die in an integrated memory assembly. In some embodiments, an integrated memory assembly includes a stack of multiple control die and/or multiple memory die. In some embodiments, the control die is connected to, or otherwise in communication with, a memory controller. For example, a memory controller may receive data to be programmed into a memory array. The memory controller will forward that data to the control die so that the control die can program that data into the memory array on the memory die.

Figure 2B:
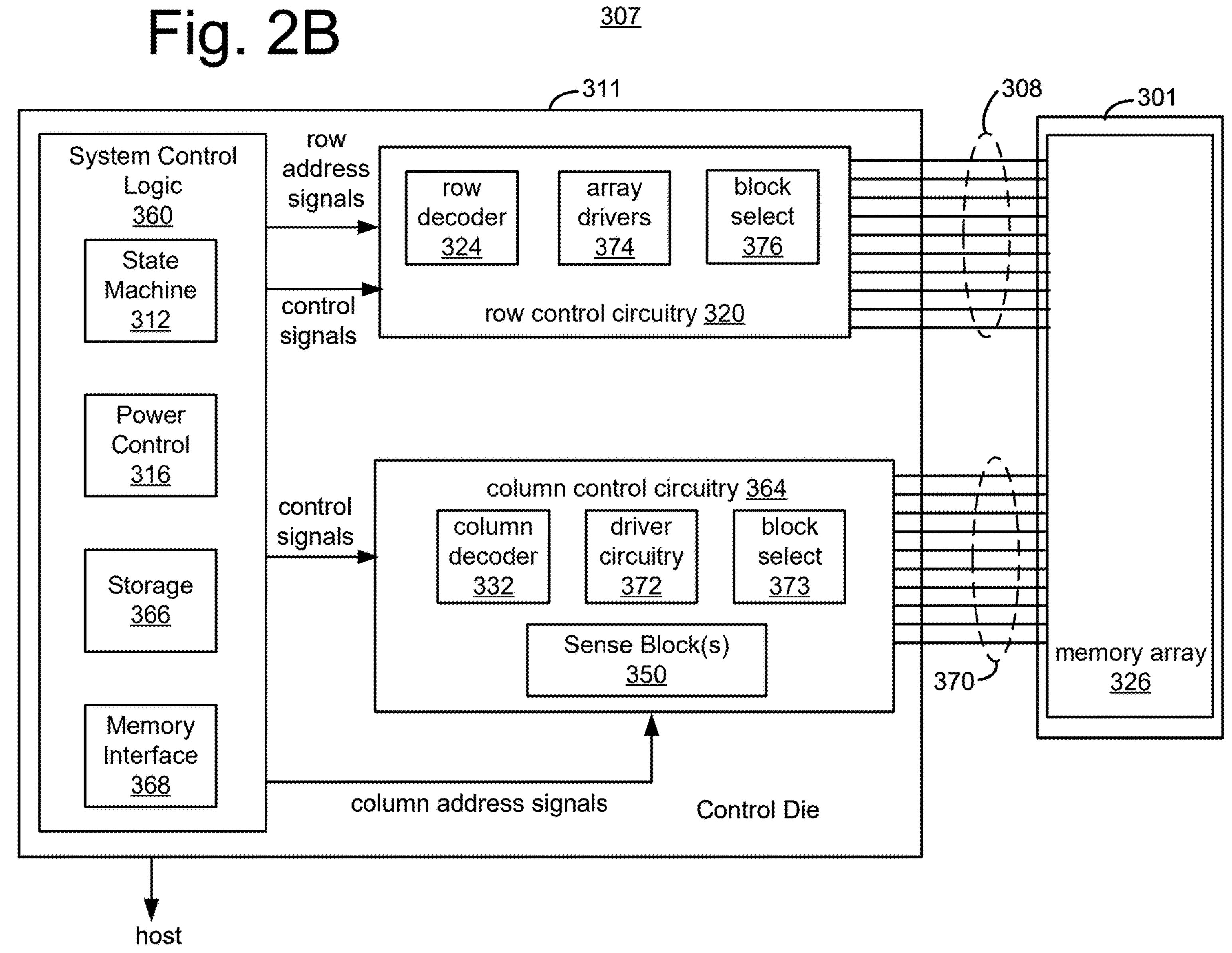
FIG. 2B is a functional block diagram of an embodiment of an integrated memory assembly.

FIG. 2B shows an alternative arrangement to that of FIG. 2A which may be implemented using wafer-to-wafer bonding to provide a bonded die pair. FIG. 2B depicts a functional block diagram of one embodiment of an integrated memory assembly 307. One or more integrated memory assemblies 307 may be used in a memory package 104 in memory system 100. The integrated memory assembly 307 includes two types of semiconductor die (or more succinctly, "die"). Memory die 301 includes memory array 326 (memory structure). Memory array 326 may contain non-volatile memory cells.

Control die 311 includes column control circuitry 364, row control circuitry 320 and system control logic 360 (including state machine 312, power control module 316, storage 366, and memory interface 368). In some embodiments, control die 311 is configured to connect to the memory array 326 in the memory die 301. FIG. 2B shows an example of the peripheral circuitry, including control circuits, formed in a peripheral circuit or control die 311 coupled to memory array 326 formed in memory die 301. System control logic 360, row control circuitry 320, and column control circuitry 364 are located in control die 311. In some embodiments, all or a portion of the column control circuitry 364 and all or a portion of the row control circuitry 320 are located on the memory die 301. In some embodiments, some of the circuitry in the system control logic 360 is located on the on the memory die 301.

System control logic 360, row control circuitry 320, and column control circuitry 364 may be formed by a common process (e.g., CMOS process), so that adding elements and functionalities, such as ECC, more typically found on a memory controller 102 may require few or no additional process steps (i.e., the same process steps used to fabricate controller 102 may also be used to fabricate system control logic 360, row control circuitry 320, and column control circuitry 364). Thus, while moving such circuits from a die such as memory die 301 may reduce the number of steps needed to fabricate such a die, adding such circuits to a die such as control die 311 may not require many additional process steps.

FIG. 2B shows column control circuitry 364 including sense block(s) 350 on the control die 311 coupled to memory array 326 on the memory die 301 through electrical paths 370. For example, electrical paths 370 may provide electrical connection between column decoder 332, driver circuitry 372, and block select 373 and bit lines of memory array (or memory structure) 326. Electrical paths may extend from column control circuitry 364 in control die 311 through pads on control die 311 that are bonded to corresponding pads of the memory die 301, which are connected to bit lines of memory structure 326. Each bit line of memory structure 326 may have a corresponding electrical path in electrical paths 370, including a pair of bond pads, which connects to column control circuitry 364. Similarly, row control circuitry 320, including row decoder 324, array drivers 374, and block select 376 are coupled to memory array 326 through electrical paths 308. Each of electrical paths 308 may correspond to a word line, dummy word line, or select gate line. Additional electrical paths may also be provided between control die 311 and memory die 301.

In some embodiments, there is more than one control die 311 and/or more than one memory die 301 in an integrated memory assembly 307. In some embodiments, the integrated memory assembly 307 includes a stack of multiple control die 311 and multiple memory die 301. In some embodiments, each control die 311 is affixed (e.g., bonded) to at least one of the memory dies 301.

The exact type of memory array architecture or memory cell included in memory structure 326 is not limited to the examples above. Many different types of memory array architectures or memory cell technologies can be used to form memory structure 326. No particular nonvolatile memory technology is required for purposes of the new claimed embodiments proposed herein. Other examples of suitable technologies for memory cells of the memory structure 326 include ReRAM memories, magnetoresistive memory (e.g., MRAM, Spin Transfer Torque MRAM, Spin Orbit Torque MRAM), phase change memory (e.g., PCM), and the like. Examples of suitable technologies for architectures of memory structure 326 include two dimensional arrays, three dimensional arrays, cross-point arrays, stacked two dimensional arrays, vertical bit line arrays, and the like.

One example of a ReRAM, or PCMRAM, cross point memory includes reversible resistance-switching elements arranged in cross point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive memory (MRAM) stores data by magnetic storage elements. The elements are formed from two ferromagnetic plates, each of which can hold a magnetization, separated by a thin insulating layer. One of the two plates is a permanent magnet set to a particular polarity; the other plate's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. Note that the use of "pulse" in this document does not require a square pulse, but includes a (continuous or non-continuous) vibration or burst of sound, current, voltage light, or other wave.

A person of ordinary skill in the art will recognize that the technology described herein is not limited to a single specific memory structure, but covers many relevant memory structures within the spirit and scope of the technology as described herein and as understood by one of ordinary skill in the art.

Figure 3:
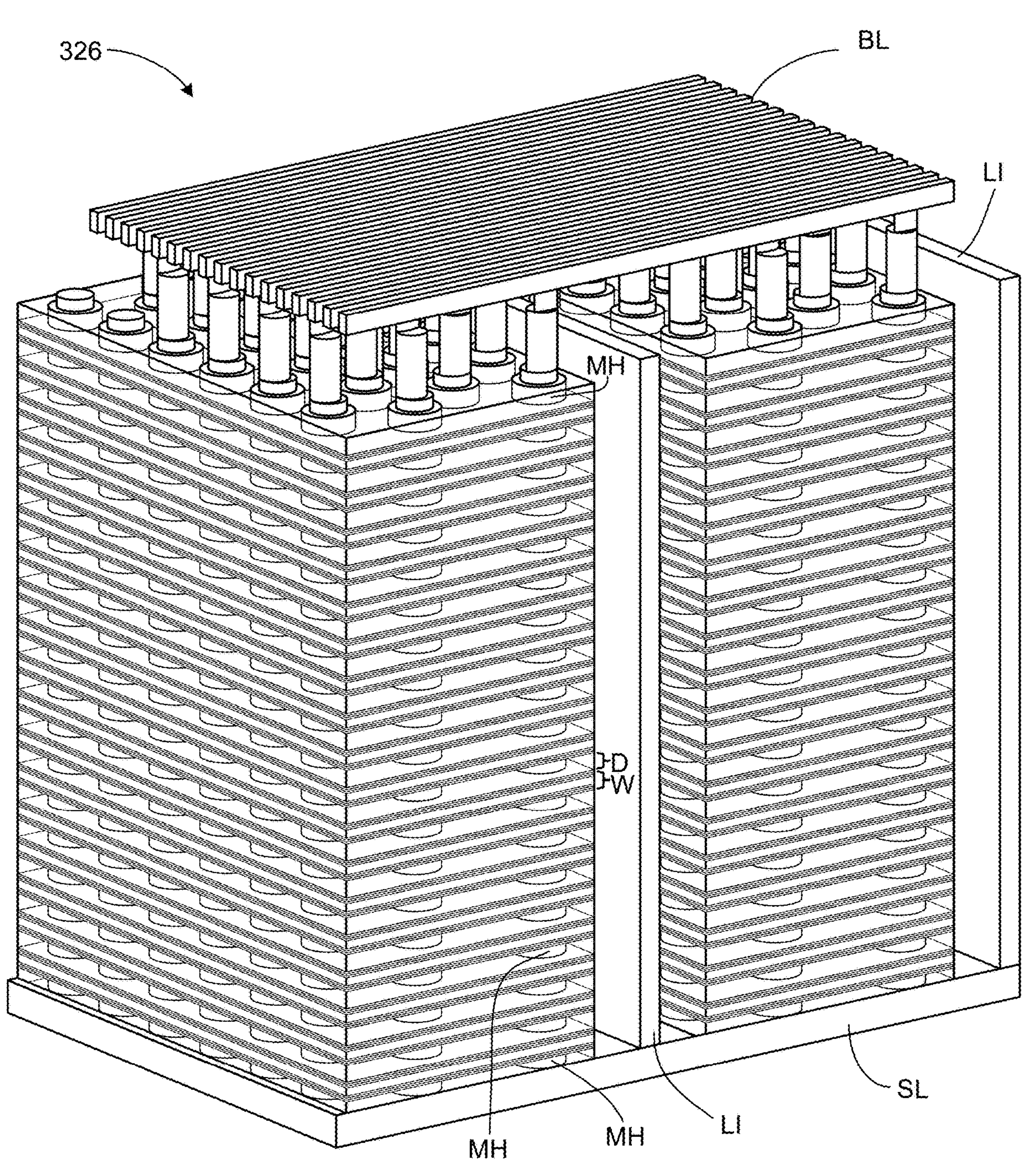
FIG. 3 is a perspective view of a portion of one embodiment of a monolithic three-dimensional memory structure.

FIG. 3 is a perspective view of a portion of one example embodiment of a monolithic three-dimensional memory array that can comprise memory structure 326, which includes a plurality memory cells. For example, FIG. 3 shows a portion of one block of memory. The structure depicted includes a set of bit lines BL positioned above a stack of alternating dielectric layers and conductive layers. For example purposes, one of the dielectric layers is marked as D and one of the conductive layers (also called word line layers) is marked as W. The number of alternating dielectric layers and conductive layers can vary based on specific implementation requirements. One set of embodiments includes between 108-278 alternating dielectric layers and conductive layers, for example, 127 data word line layers, 8 select layers, 4 dummy word line layers and 139 dielectric layers.

More or fewer than 108-278 layers can also be used. As will be explained below, the alternating dielectric layers and conductive layers are divided into four "fingers" by local interconnects LI. FIG. 3 shows two fingers and two local interconnects LI. Below the alternating dielectric layers and word line layers is a source line layer SL. Memory holes are formed in the stack of alternating dielectric layers and conductive layers. For example, one of the memory holes is marked as MH. Note that in FIG. 3, the dielectric layers are depicted as see-through so that the reader can see the memory holes positioned in the stack of alternating dielectric layers and conductive layers. In one embodiment, NAND strings are formed by filling the memory hole with materials including a charge-trapping layer to create a vertical column of memory cells. Each memory cell can store one or more bits of data.

Figure 4:
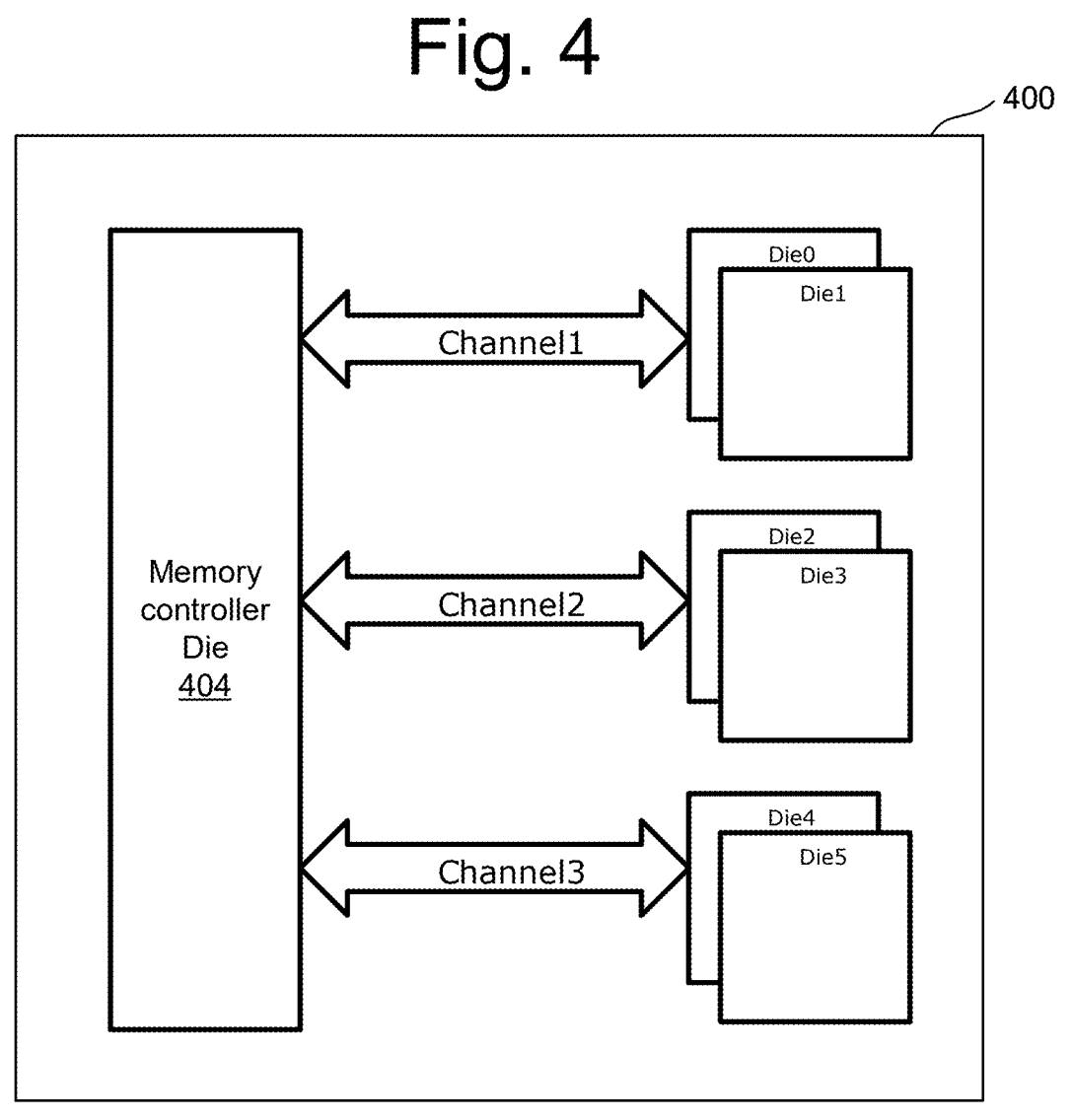

FIG. 4 shows an example of a memory system 400 that includes a memory controller die 404 (e.g., memory controller 102 formed on die 404) connected to six memory dies (Die0 to Die5) by three channels (Channel1, Channel2 and Channel3). Each channel may be configured to convey one or more data signal to and/or from a multi-die stack of two or more dies. In a multi-die product scenario, each die can have different characteristics, for example, as a result of different process conditions. Such different characteristics may affect communication over a data bus (e.g., over Channel1, Channel2 and Channel3, which may be TM data buses). In some cases, some training may be performed to ensure that communication between a memory controller die and memory dies is appropriately configured.

In an example of training to ensure adequate communication, die specific Data Valid Window (DVW) training may be performed at certain times. For example, every time memory system 400 is powered-on after a period of being powered-off (cold boot), DVW training may be performed for each die of Die0 to Die5.

With local drift in temperature and voltage of a die during operation, a DVW for one or more of Die0 to Die5 may move right or left (DVW shift or drift). For example, different die characteristics and/or different temperatures experienced by different dies (e.g., due to different usage) and/or different voltage drift (e.g., due to different loads) and/or other factors may cause different DVW drift for different dies. For example, alignment of a data signal (e.g., DQ) and a timing signal (e.g., a data strobe, DQS) may affect communication between memory controller die 404 and Die0 to Die5. As DQS and DQ paths are different (unmatched architecture), misalignment of such signals may occur and, as a result, the system may not consistently capture the right data leading to a high BER (Bit error rate).

To mitigate effects of DVW drift, a die may undergo re-training by stopping the transfer of data (e.g., read or write data) and performing re-training (e.g., using training data). Retraining may be required as a result of changing temperature (e.g., retraining for 10 degree temperature change), changing voltage (e.g., retraining for 10 millivolt change) and/or other factors. Such re-training may impact data throughput, especially if it is performed frequently (e.g., if there is significant drift due to temperature change, voltage drift and/or other factors).

Aspects of the present technology are directed to efficient on-the-fly DVW tracking and adjustment that may be performed with little or no impact on data throughput (e.g., without stopping data transfer and without performing a full re-training operation). Such tracking and adjustment may require little power and may be implemented by circuits that are compact (area-efficient).

Figure 5:
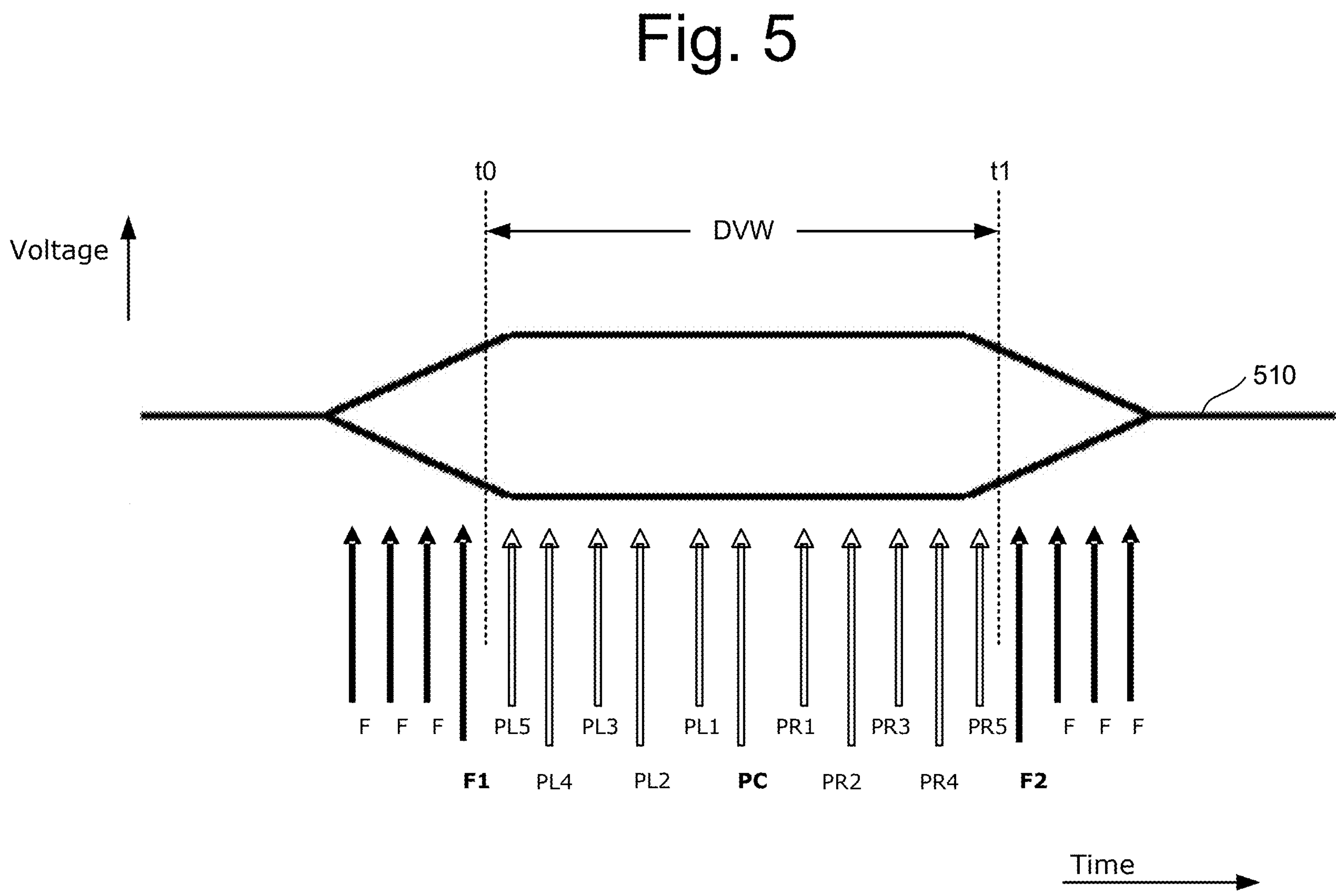
FIG. 5 shows an example of determining boundaries of a Data Voltage Window (DVW).

FIG. 5 shows an example of a training operation that may be used to align sampling times (e.g., initiated by a signal such as DQS) with DVWs of a data signal 510. The voltage of the data signal is sampled at a relatively high frequency in this operation as indicated by pointers. Voltage samples obtained within the DVW are passing (e.g., a passing-central pointer, PC, passing-left pointers, PL5 to PL1 and passing-right pointers, PR1 to PR5). Voltage samples obtained outside the DVW are failing (pointers indicated as "F", "F1" and "F2"). For example, a voltage sample fails if it is not the same as a sample value at PC pointer for a corresponding logic bit (e.g., logic bit of signal 510 is 0 and sample indicates logic bit=1, or logic bit of signal 510 is 1 and sample indicates logic bit=0). By sampling at a relatively high frequency, the locations of boundaries of the DVW may be obtained with a relatively high degree of accuracy. For example, the left side limit of the DVW, t0, may be detected as being between F1 (rightmost failing pointer) and PL5 (leftmost passing pointer) while the right side limit of the DVW, t1, may be detected as being between PR5 (rightmost passing pointer) and F2 (leftmost failing pointer). Using results of the sampling shown in FIG. 5 (e.g., location of DVW boundaries at F1 and F2) sampling may be realigned with the DVW (e.g., sampling at PC, which is in the middle or center of DVW, at or near the midpoint between F1 and F2). For example, sampling may be realigned by a positive or negative time offset to ensure sampling in the middle of the DVW (e.g., at time indicated by PC), which may reduce the BER.

According to aspects of the present technology, DVW tracking and adjustment may be implemented without necessitating a large number of voltage samples (e.g., fewer than the 19 pointers corresponding to sampling voltage at 19 times shown in FIG. 5) and without sending training data over the data bus (e.g., user data may be used).

In an example, initial training (e.g., during a training period prior to subsequent use) may be performed in an appropriate manner (e.g., as illustrated in FIG. 5) to detect the left and right boundaries of a DVW (e.g., t0 and t1). Subsequently, DVW tracking may be implemented using only three voltage samples for a DVW, e.g., a sample on either side of a DVW and a sample in the middle. These samples may be compared to detect DVW drift. For example, a first bit sampled on a first side (e.g., left side) of a DVW of a data signal (e.g., from F1) may be compared with a middle bit from the middle of the DVW (e.g., from PC) to detect first misalignment of sampling with the DVW. A second bit sampled on a second side (e.g., right side) of the DVW (e.g., from F1) may be compared with the middle bit to detect second misalignment of sampling with the DVW. F1 and F2 represent sampling times immediately outside the DVW such that when sampling is aligned with DVWs the first and second bits from F1 and F2 are different to the middle bit from PC. Comparing the first bit and the middle bit (e.g., F1 and PC) to detect first misalignment of sampling with the DVW may include detecting equality of the first bit and the middle bit and comparing the second bit and the middle bit to detect second misalignment of sampling with the DVW may include detecting equality of the second bit and the middle bit (e.g., equality of the middle bit from PC with either F1 or F2 indicates misalignment).

When misalignment is found, sampling times for the data signal may be adjusted according to detection of the first or second misalignment. For example, sampling may be shifted left or right (earlier or later) according to whether first or second misalignment is detected. Note that while FIG. 5 shows time increasing from left to right so that left side samples are earlier in time than right side samples, the present technology is not limited to this arrangement (e.g., time could also increase from right to left so that right side samples are earlier in time than left side samples).

Figure 6A:
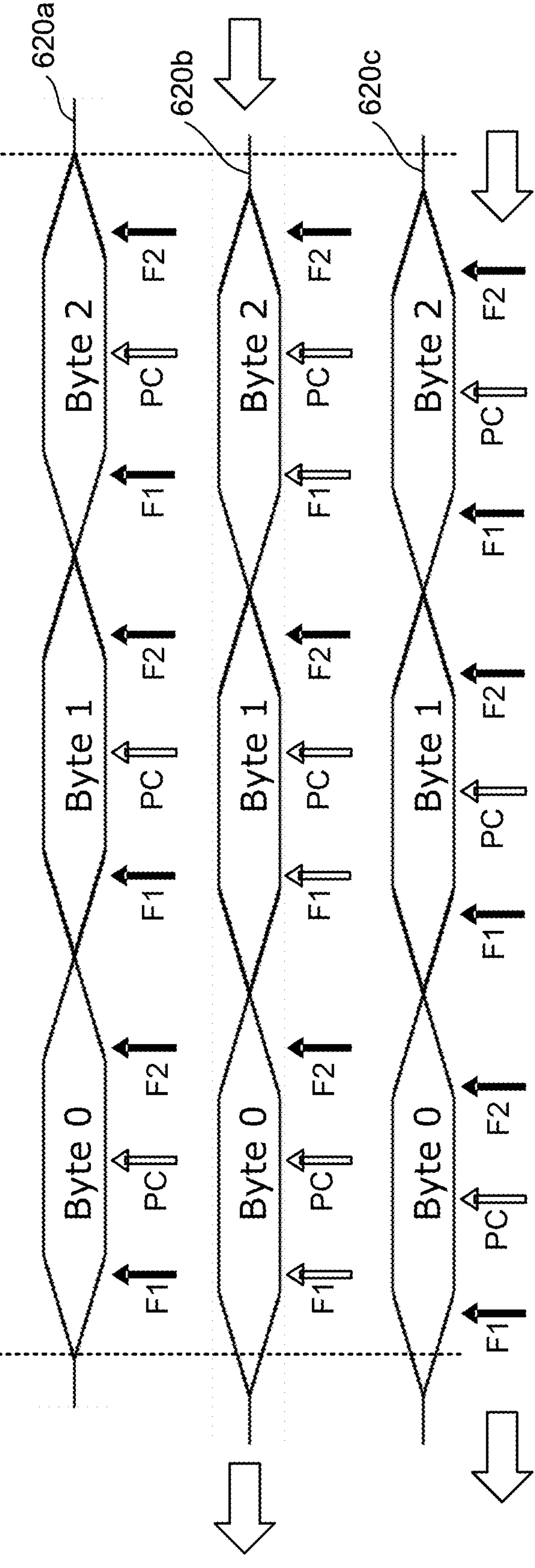
FIGS. 6A-D illustrate examples of misalignment of sampling with DVWs and adjustment for realignment.
Figure 6B:
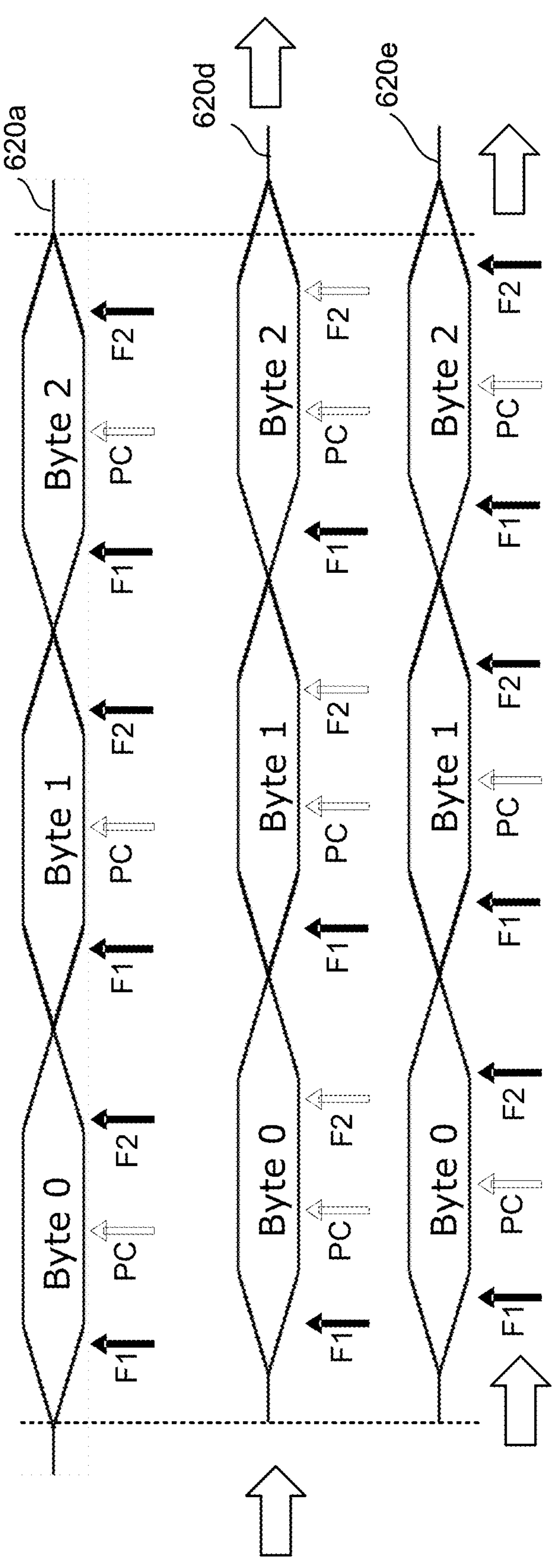

FIGS. 6A-B show examples of DVW tracking and adjustment of sampling times (e.g., applied to data transfer via Channel1, Channel2, Channel3). FIG. 6A shows an embodiment that includes data signal 620*a* at a first time showing an example in which sampling is aligned with DVWs (three DVWs, Byte 0, Byte1 and Byte 2) so that the first and second bits from F1 and F2 (black arrows) are different to the middle bit (outline arrow) as previously described with respect to FIG. 5. Comparing the first bit and the middle bit (from F1 and PC) to detect first (e.g., left) misalignment of sampling with the DVW in this situation indicates inequality and therefore absence of first (left) misalignment. Comparing the second bit and the middle bit (from F2 and PC) to detect second (right) misalignment of sampling with the DVW indicates inequality and therefore absence of second (right) misalignment.

FIG. 6A also shows data signal 620*b* (e.g., voltage signal 620*a* at a later time) after some left drift has occurred, which results in first (left) misalignment of sampling with DVWs. Because the DVW has moved leftward, sampling at F1 produces the same bit as at PC. Comparing the first bit with the middle bit (from F1 and PC respectively) to detect first misalignment of sampling with the DVW indicates equality and therefore indicates first (left) misalignment. Comparing the second bit with the middle bit (from F2 and PC respectively) to detect second misalignment of sampling with the DVW indicates inequality and therefore indicates absence of second (right) misalignment.

FIG. 6A shows data signal 620*c* (e.g., voltage signal 620*b* at a later time) after adjustment has been implemented to reduce or eliminate misalignment. Sampling pointers F1, PC and F2 are shown shifted to the left to align with DVWs of data signal 620*c*. For example, in response to detecting equality of bits from F1 and PC, an offset time may be applied to sample earlier (e.g., negative time offset applied to DQS). As a result of changing sampling times (as indicated by leftward shifting of pointers F1, PC and F2), inequality of the first bit and middle bit (from F1 and PC respectively) and inequality of the second bit and middle bit (from F2 and PC respectively) is restored, indicating alignment of sampling time with DVW windows. Subsequent sampling may occur using the shifted sampling times (e.g., taking data at times indicated by shifted PC).

FIG. 6B shows an embodiment that includes data signal 620*a* at a first time showing an example in which sampling is aligned with DVWs so that the first and second bits from F1 and F2 (black arrows) are different to the middle bit (outline arrow) as previously described with respect to FIG. 6A.

FIG. 6B also shows data signal 620*d* (e.g., voltage signal 620*a* at a later time) after some right drift has occurred, which results in second (right) misalignment of sampling with DVWs. Because the DVW has moved rightward, sampling at F2 produces the same bit as at PC. Comparing the second bit with the middle bit (from F2 and PC respectively) to detect second misalignment of sampling with the DVW indicates equality and therefore indicates second (right) misalignment. Comparing the first bit with the middle bit (from F1 and PC respectively) to detect first misalignment of sampling with the DVW indicates inequality and therefore indicates absence of first (left) misalignment.

FIG. 6B shows voltage signal 620*e* (e.g., voltage signal 620*d* at a later time) after adjustment has been implemented to reduce or eliminate misalignment. Sampling pointers F1, PC and F2 are shown shifted to the right to align with DVWs. For example, in response to detecting equality of bits from F2 and PC, an offset time may be applied to sample later (e.g., positive time offset applied to DQS). As a result of changing sampling times (as indicated by rightward shifting of pointers F1, PC and F2), inequality of the second bit and middle bit (from F2 and PC respectively) and inequality of the first bit and middle bit (from F1 and PC respectively) is restored indicating alignment of sampling time with DVW windows. Subsequent sampling may occur using the shifted sampling times (e.g., taking data at times indicated by shifted PC).

While FIGS. 6A-B show examples in which timing shifts are detected using samples that are the closest failing samples on either side (left and right sides) of the DVW, in other examples, other samples may be used. For example, instead of using the innermost failing samples (at F1 and F2) the outermost passing samples (at PL5 and PR5 of FIG. 5) may be used. In this example, bits from each sample should be equal if timing is aligned and misalignment is indicated by inequality.

Figure 6C:
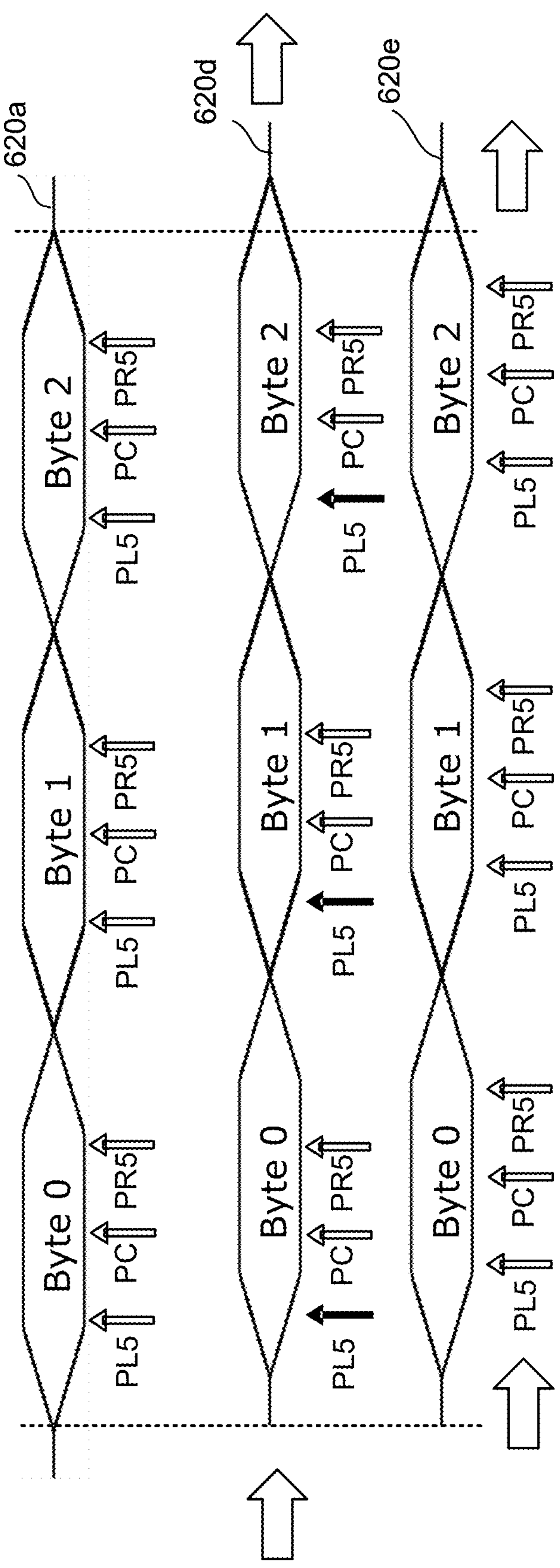

FIG. 6C shows an embodiment that includes data signal 620*a* at a first time showing an example in which sampling is aligned with DVWs. In this example, the first and second sampling times, at PL5 and PR5, are sampling times immediately inside DVW boundaries such that when sampling is aligned with DVWs the first and second bits are identical to the middle bit. Comparing the first bit and the middle bit (from PL5 and PC respectively) to detect first (left) misalignment of sampling with the DVW includes detecting inequality of the first bit and the middle bit and comparing the second bit and the middle bit to detect second misalignment of sampling with the DVW includes detecting inequality of the second bit and the middle bit. Because voltage signal 620*a* is aligned with sampling pointers PL5, PC and PR5, the first, second and middle bits are the same so that there is no inequality and therefore no left or right misalignment.

FIG. 6C also shows data signal 620*d* (e.g., voltage signal 620*a* at a later time) after some right drift has occurred, which results in right misalignment of sampling with DVWs. Because the DVW has moved rightward, sampling at PL5 and PC produces different (unequal) bits. Comparing the first bit with the middle bit (from PL5 and PC respectively) to detect right misalignment of sampling with the DVW indicates inequality and therefore indicates right misalignment. Comparing the second bit with the middle bit (from PR5 and PC respectively) to detect left misalignment of sampling with the DVW indicates equality and therefore indicates absence of left misalignment.

FIG. 6C shows voltage signal 620*e* (e.g., voltage signal 620*d* at a later time) after adjustment has been implemented to reduce or eliminate misalignment. Sampling pointers PL5, PC and PR5 are shown shifted to the right to align with DVWs. For example, in response to detecting inequality of bits from PL5 and PC, an offset time may be applied to sample later (e.g., positive time offset applied to DQS). As a result of changing sampling times (as indicated by rightward shifting of pointers PL5, PC and PR5), equality of the first bit and middle bit (from PL5 and PC respectively) is restored indicating alignment of sampling time with DVW windows. Subsequent sampling may occur using the shifted sampling times (e.g., taking data at times indicated by shifted PC). While FIG. 6C shows only the example of a right shift, it will be understood that a left shift may be tracked and appropriate adjustment made in a similar manner.

Figure 6D:
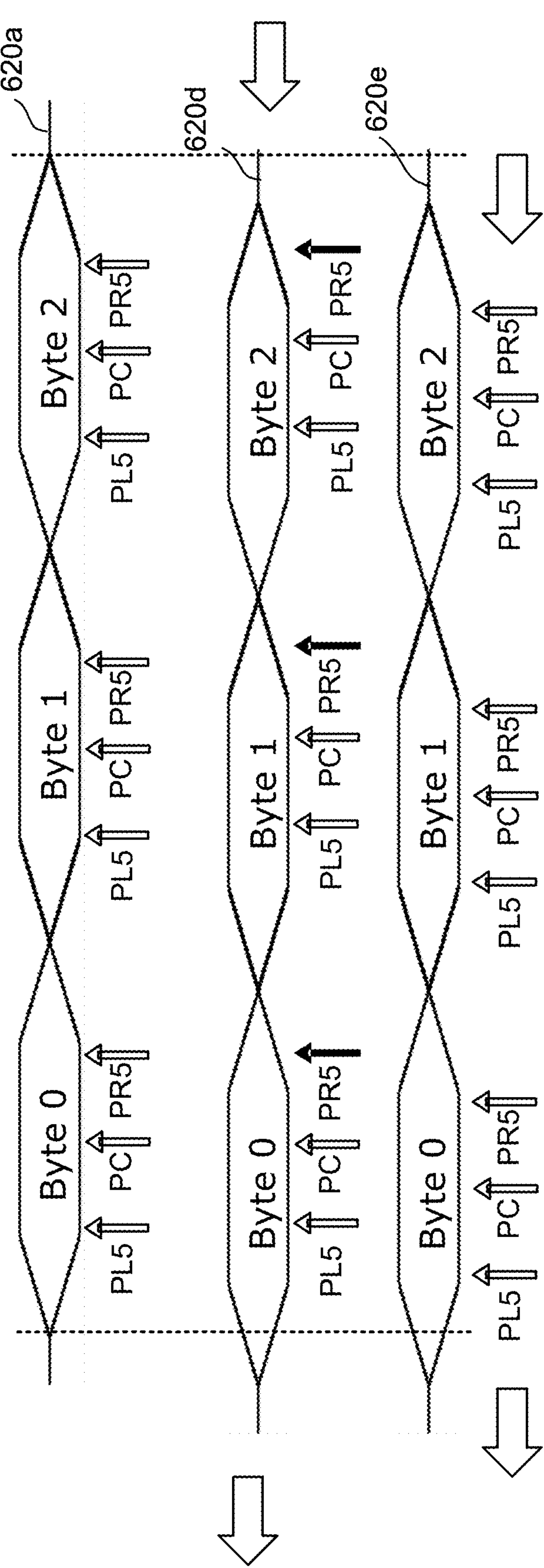

FIG. 6D shows an embodiment that includes data signal 620*a* at a first time showing an example in which sampling is aligned with DVWs. In this example, as in FIG. 6C, the first and second sampling times, at PL5 and PR5, are sampling times immediately inside DVW boundaries such that when sampling is aligned with DVWs the first and second bits are identical to the middle bit. Comparing the first bit and the middle bit (from PL5 and PC respectively) to detect first (left) misalignment of sampling with the DVW includes detecting inequality of the first bit and the middle bit and comparing the second bit and the middle bit to detect second misalignment of sampling with the DVW includes detecting inequality of the second bit and the middle bit. Because voltage signal 620*a* is aligned with sampling pointers PL5, PC and PR5, the first, second and middle bits are the same so that there is no inequality and therefore no left or right misalignment.

FIG. 6D also shows data signal 620*d* (e.g., voltage signal 620*a* at a later time) after some left drift has occurred, which results in left misalignment of sampling with DVWs. Because the DVW has moved leftward, sampling at PR5 and PC produces different (unequal) bits. Comparing the first bit with the middle bit (from PL5 and PC respectively) to detect right misalignment of sampling with the DVW indicates equality and therefore indicates no right misalignment. Comparing the second bit with the middle bit (from PR5 and PC respectively) to detect left misalignment of sampling with the DVW indicates inequality and therefore indicates left misalignment.

FIG. 6D shows voltage signal 620*e* (e.g., voltage signal 620*d* at a later time) after adjustment has been implemented to reduce or eliminate misalignment. Sampling pointers PL5, PC and PR5 are shown shifted to the left to align with DVWs. For example, in response to detecting inequality of bits from PR5 and PC, an offset time may be applied to sample earlier (e.g., negative time offset applied). As a result of changing sampling times (as indicated by leftward shifting of pointers PL5, PC and PR5), equality of the second bit and middle bit (from PR5 and PC respectively) is restored indicating alignment of sampling time with DVW windows. Subsequent sampling may occur using the shifted sampling times (e.g., taking data at times indicated by shifted PC).

In some examples of the present technology, the boundaries of a DVW are obtained from transitions between passing and failing samples. In order to have failing samples at either side of a DVW, a logic transition may be required (e.g., logic 0/1 transition or voltage high/low transition). While test data may be configured to ensure such logic transitions occur (e.g., alternating between logic 0 and 1 and between high and low voltage) aspects of the present technology may be applied to other data (e.g., user data) that may not be configured in this way (e.g., may include two or more identical bits in series). Where identical bits are received, the samples obtained may be ignored (e.g., no logic/voltage transitions may occur between bits).

FIG. 7A shows an example that includes a series of identical logical bits in Byte0, followed by a logic transition to a different logical bit in Byte1. Voltage sampling for DVW tracking may be performed in sets of three samples per set, corresponding to a first bit sampled on a first side of a DVW (e.g., at F1), a second bit sampled on a second side of the DVW (e.g., at F2) and a middle bit from the middle of the DVW (e.g., at PC) as previously shown. For example, FIG. 7A shows sets of samples 730*a-c* corresponding to Byte0 and set 730*d* corresponding to Byte1. Sets 730*a* and 730*b* correspond to bits that are the same as neighboring bits so that signal voltage does not change. Accordingly, samples at F1 and F2 are the same as at PC so that these samples cannot be used to detect misalignment and may be ignored. Set 730*c* corresponds to a bit that has a logic/voltage transition on one side (right side) only so that bits from F1 and PC are the same while bits from F2 and PC are different. Where logic/voltage transitions occur on either side of a bit, this pattern may indicate a left shift (e.g., as shown in FIG. 6A). However, in this case, detecting that bits from F1 and PC are equal is the result of a neighboring bit being the same. Thus, the comparison of bits from F1 and PC of set 730*c* may be discarded. Because a logic transition occurs on the right side of set 730*c*, the comparison of bits from PC and F2 may be used to detect right shift. Set 730*d* corresponds to a bit with logic transitions on either side so that samples at F1 and F2 are different to the sample at PC. Results from a set of samples such as 730*d*, with logic transitions on either side, may be used for DVW tracking including both right and left shift. Results from a set of samples such as 730*c*, with a logic transition on only one side, may be used for DVW tracking in only one sense (e.g., right shift). Results from sets such as 730*a-b*, with no logic transition on either side, may be discarded.

FIG. 7B illustrates a scheme to consider only relevant data (e.g., only voltage samples at logic transitions such as high-to-low or low-to-high). FIG. 7B shows a column for a sampled bit (e.g., from the middle of the DVW corresponding to pointer PC(n)) "Data @PC(n)" and a column for a sampled bit from the middle of a neighboring DVM "Data @PC(n−1)." These bits are compared to determine whether to consider sampled voltages (e.g., from F1 or F2) in a DVM tracking scheme. If bits sampled at PC(n−1) and PC(n) are the same (both 0 in top line and both 1 in bottom line) then no logic transition occurs between bits and sample voltages are ignored. If bits sampled at PC(n−1) and PC(n) are different (logic 0/1 or 1/0 in middle two lines) then a logic transition occurs between bits and sample voltages are considered.

Aspects of the present technology may be selectively applied, which may reduce power consumption. For example, FIG. 8 shows an example of a method that may be used to maintain high throughput with low power consumption on a data bus. A control circuit tracks DVW 840, for example, by checking error rates (BER) or otherwise. A determination is made as to whether DVW alignment meets a threshold level 842. If DVW alignment is greater than the threshold level (DVW>Threshold="Yes" e.g., errors below a limit) then operation of the data bus continues (e.g., no action is needed regarding possible DVW shift). If DVW alignment is not greater than the threshold level (DVW>Threshold="No" e.g., errors above a limit) then detection and correction 844 (e.g., as shown in FIGS. 6A-D) may be initiated.

Figure 9:
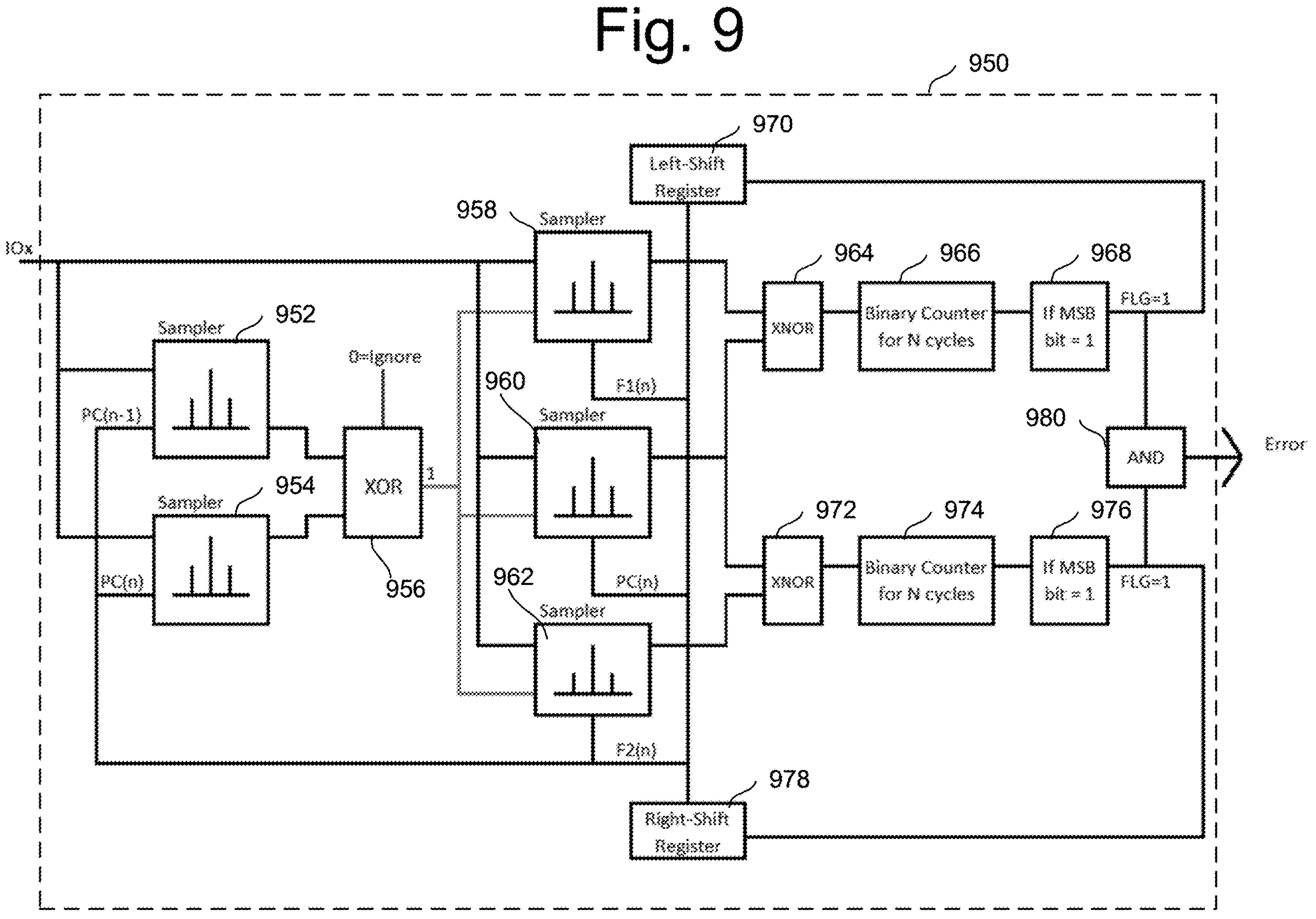
FIG. 9 shows an example of a control circuit to perform DVW tracking and adjustment.

FIG. 9 shows an example implementation of aspects of the present technology to ensure high throughput in one or both directions over a data bus (e.g., between memory controller die 404 and Die0 to Die5). FIG. 9 shows a simplified schematic of control circuits 950 configured to implement DVW tracking. Control circuits 950 receive a data signal (IOx), detect misalignment between sampling times and DVWs and adjusts sampling times accordingly to realign sampling times with DVWs. The data signal is sampled by samplers 952 and 954 at PC(n−1) and PC(n) respectively (e.g., samples from centers of two sequential DVWs: DVW(n−1) and DVW(n)). Bits from samplers 952 and 954 are compared to determine if a logic transition (transition between different logical bits) occurs. In FIG. 9, Exclusive OR (XOR) circuit 956 is used to generate an output (e.g., as shown in the table of FIG. 7B), with an output "0" (no change) indicating to ignore the transition between PC(n−1) and PC(n) for purposes of DVW tracking and a logic "1" (transition between logic levels and corresponding voltages) indicating a logic transition that can be used for DVW tracking. Logic "1" from XOR circuit 956 may enable sampling by samplers 958 and 962 on the left and right sides of DVW(n) respectively, at F1(n) and F2(n), and at PC(n) in the middle of DVW(n).

Bits from sampler 958 (F1(n)) and sampler 960 (PC(n)) are compared to detect a left shift. An Exclusive NOR (XNOR) circuit 964 is used to output a bit that indicates when bits from samplers 958 and 960 are the same (comparison may be performed by any suitable comparator circuit), which indicates a left shift (e.g., as illustrated in FIG. 6A). Bits from XNOR circuit 964 are sent to Binary counter 966, which may count bits over a number of cycles (e.g., N cycles) where each cycle corresponds to a DVW. If, after N cycles, the most significant bit (MSB) is 1, indicating a significant number (more than a threshold number) of left shifted DVWs during N cycles, then left shift detector 968 asserts a flag (FLG=1), which causes Left-Shift Register 970 to shift sampling times to the left (e.g., implementing a negative sampling time offset as shown in FIG. 6A).

Bits from sampler 962 (F2(n)) and sampler 960 (PC(n)) are compared to detect a right shift. XNOR circuit 972 is used to output a bit that indicates when bits from samplers 962 and 960 are the same (comparison may be performed by any suitable comparator circuit), which indicates a right shift (e.g., as illustrated in FIG. 6B). Bits from XNOR circuit 972 are sent to Binary counter 974, which may count bits over a number of cycles (e.g., N cycles) where each cycle corresponds to a DVW. If, after N cycles, the most significant bit (MSB) is 1, indicating a significant number (more than a threshold number) of right shifted DVWs during N cycles, then right shift detector 976 asserts a flag (FLG=1), which causes Right-Shift Register 978 to shift sampling times to the right (e.g., as shown in FIG. 6B). The number N and the capacity of binary counters 966 and 974 (e.g., number indicated by MSB of counter) may be configured according to the sensitivity desired. For example, the number N may be adjustable according to requirements with smaller values generally producing more sensitivity to DVW drift.

Flags from left shift detector 968 and right shift detector 976 are also sent to AND gate 980. Assertion of flags from both left shift detector 968 and right shift detector 976 indicates a significant number of both left shifted and right shifted DVWs. AND gate 980 may output an error signal when this occurs.

Control circuits 950 may be used to carry out methods described below and may be considered an example of means for comparing a first bit sampled on a first side of a DVW of a data signal of the data bus with a middle bit from the middle of the DVW to detect first misalignment of sampling with the DVW, comparing a second bit sampled on a second side of the DVW with the middle bit to detect second misalignment of sampling with the DVW and adjusting sampling times for the data signal according to detection of the first or second misalignment.

Control circuits to implement aspects of the present technology (e.g., control circuits 950) may be implemented at any suitable location(s) to track DVW shifts and make appropriate adjustment. For example, in a memory system (e.g., memory system 400) control circuits may be located at one or both ends of a data bus. For example, control circuits in memory controller die 404 may be used for DVW tracking and adjustment for data output from Die0 to Die5 (DOUT) that is sent to memory controller die 404 (corresponding data signal may be referred to as Read DQ or RDQ). Control circuits in Die0 to Die5 may be used for DVW tracking and adjustment for data input received by Die0 to Die5 (DIN) from memory controller die 404 (corresponding data signal may be referred to as Write DQ or WDQ).

Figure 10:
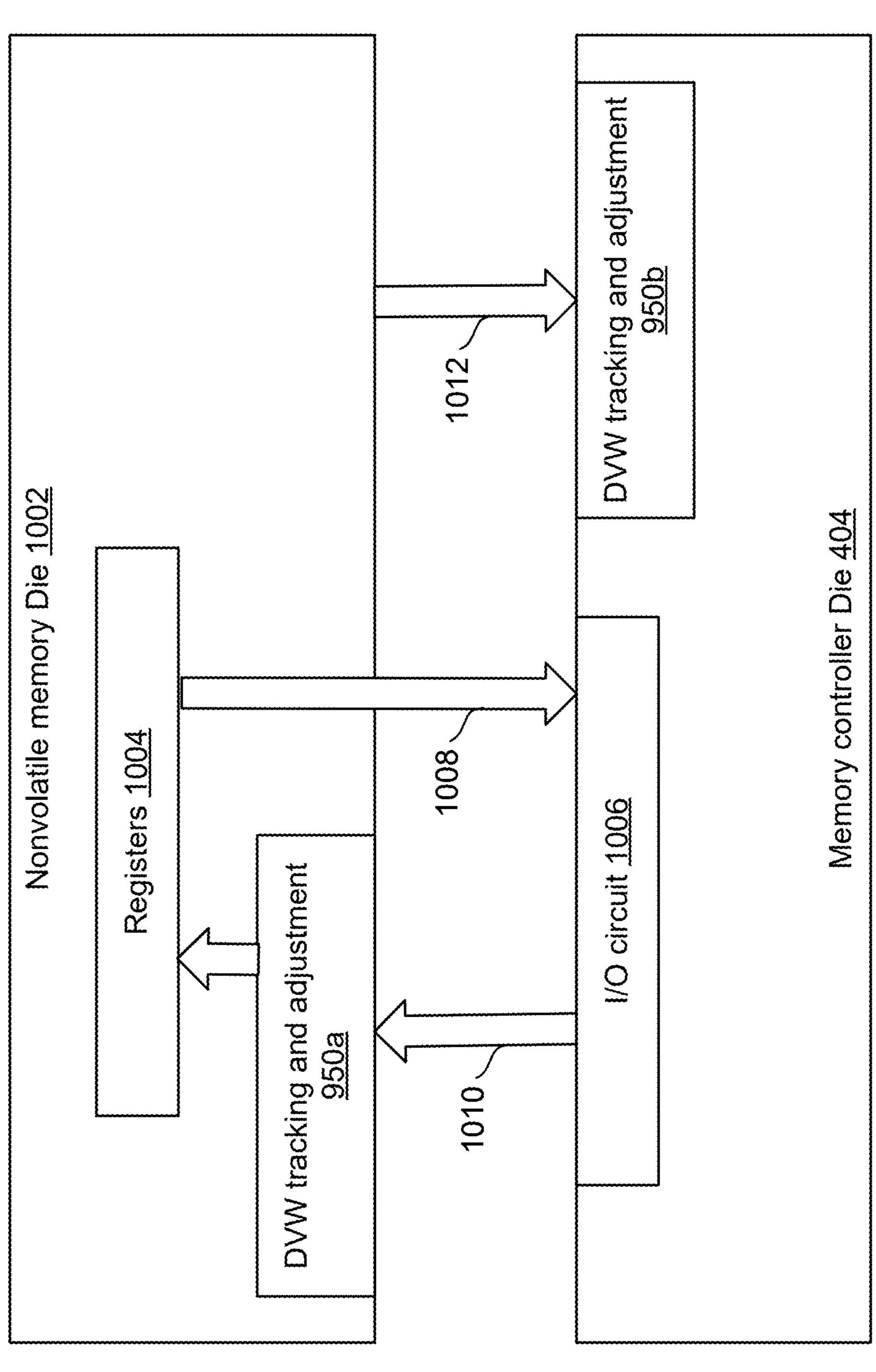
FIG. 10 shows an example of a memory system that includes DVW tracking and adjustment circuits.

FIG. 10 shows an example of a nonvolatile memory die 1002 (e.g., any of Die0 to Die5) connected to memory controller die 404. Nonvolatile memory die 1002 receives input data DIN 1010 (e.g., user data to be written in nonvolatile memory) from memory controller die 404. DVW tracking and adjustment circuit **950*a* (e.g., implemented by control circuits 950 of FIG. 9) receives DIN 1010. If a left shift or right shift is detected then appropriate bits are written into registers 1004 and are communicated 1008 to memory controller die 404 (e.g., memory controller die 404 may read bits from registers 1004). Output circuit 1006 of memory controller die 404 then then adjusts a signal used to determine sampling times (e.g., may shift DQS left/right) in response to bits from registers 1004**.

FIG. 10 also shows nonvolatile memory die 1002 sending data DOUT 1012 to memory controller die 404. DVW tracking and adjustment circuit **950*b* (e.g., implemented by additional control circuits such as control circuits 950 of FIG. 9) receives DOUT 1012 and detects if a left or right shift is present to provide on-the-fly feedback for adjustment of sampling times. Memory controller die 404 may make appropriate adjustment in response to any such shift (e.g., adjustment of a signal such as DWS). While the example of FIG. 10 shows DVW tracking and adjustment circuit 950*a* and registers 1004 in nonvolatile memory die 1002**, in some examples, such circuits may be implemented in a control die of an integrated memory assembly and the present technology is not limited to any particular locations of the circuits shown.

Figure 11A:
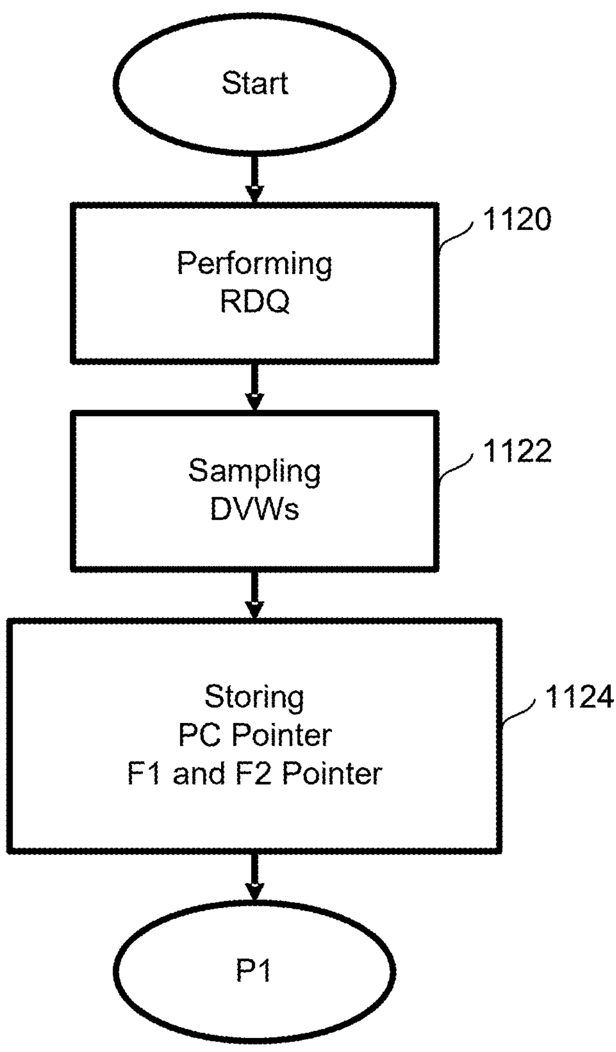
FIGS. 11A-C show an example of a method of DVW tracking and adjustment applied to data sent from a non-volatile memory die (read data).
Figure 11B:
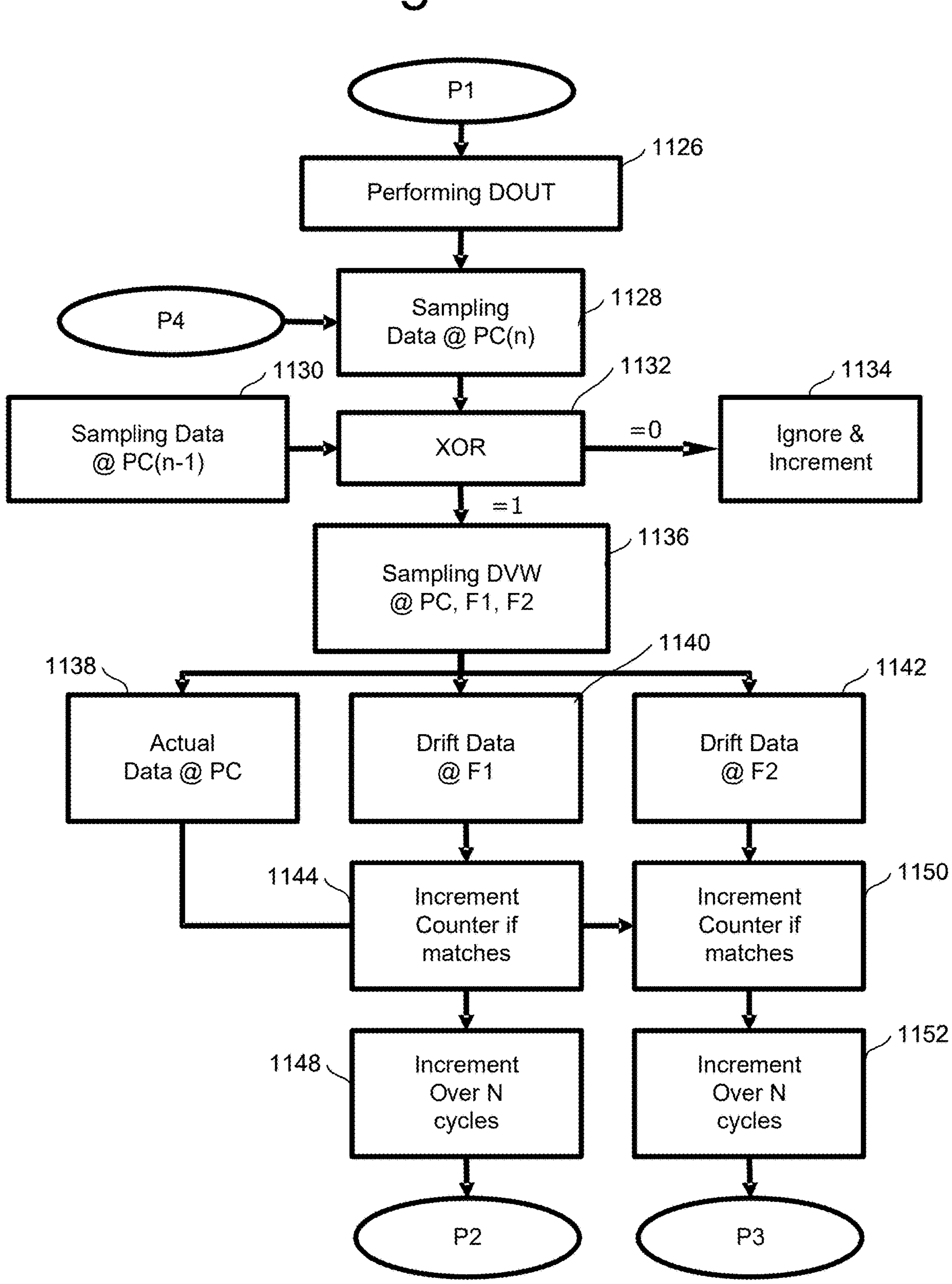
Figure 11C:
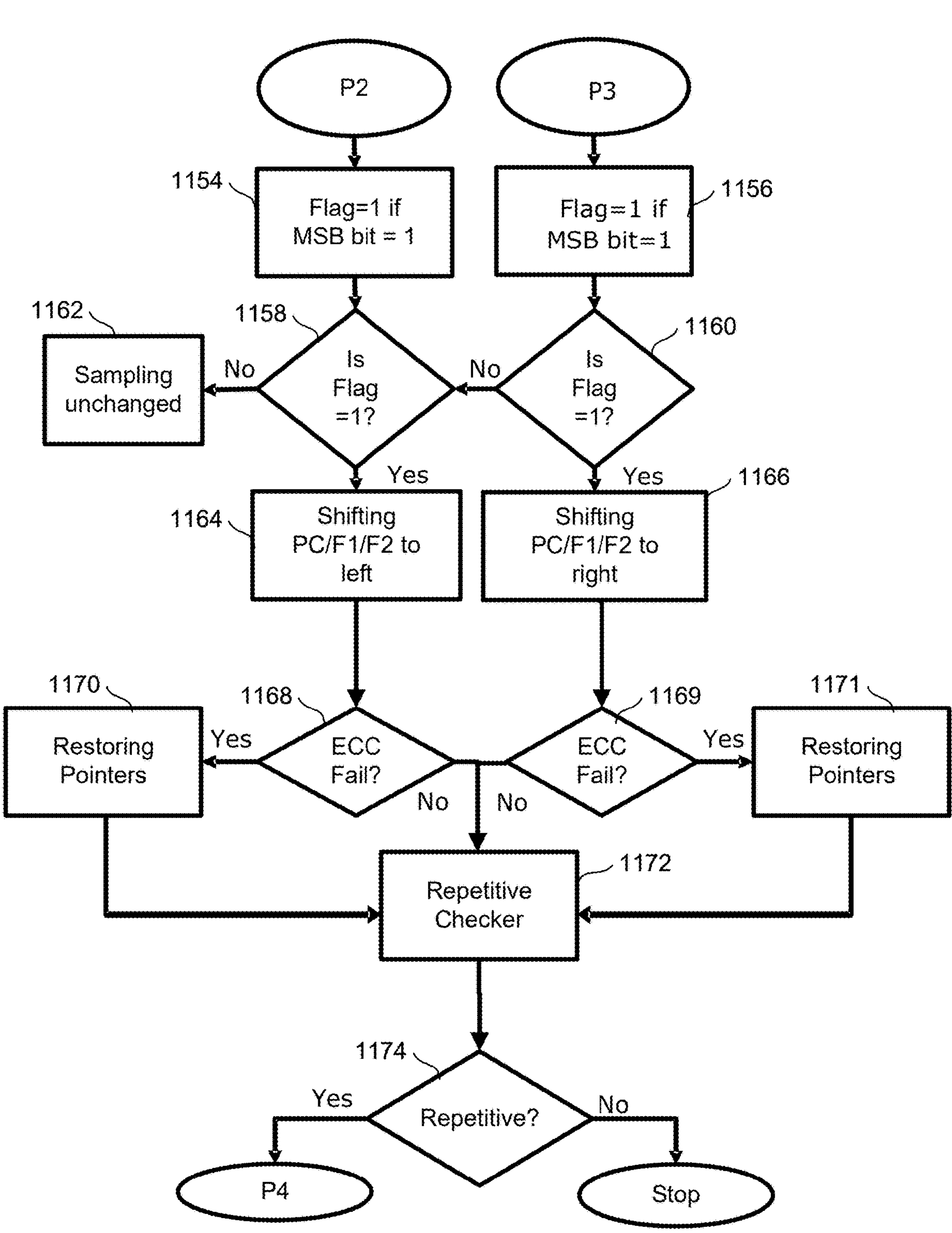

FIGS. 11A-C illustrate an example of a method that may be applied by a memory controller (e.g., memory controller die 404) to data from a nonvolatile memory die (e.g., DOUT from any of Die0 to Die5). The method of FIGS. 11A-C may be implemented, for example, by DVW tracking and adjustment circuits **950*b*, which may be implemented as illustrated in FIG. 9** or otherwise.

FIG. 11A includes performing RDQ 1120 (e.g., receiving a data signal such as a test/training signal from a nonvolatile memory die), sampling DVWs 1122 (e.g., as illustrated in FIG. 5 to determine boundaries of DVWs) and storing PC pointer, F1 and F2 pointers 1124. The steps illustrated in FIG. 11A may be performed in an initiation operation (e.g., during power-on after some period without power).

FIG. 11B (which continues from FIG. 11A at point P1) includes performing DOUT 1126 (e.g., transferring data from a nonvolatile memory die to a memory controller die), sampling the data at PC(n) 1128 and sampling the data at PC(n−1) 1130. The method further includes performing an XOR operation 1132 to determine if bits are the same (XOR=0) or different (XOR=1). If bits are the same then the transition PC(n−1) to PC(n) is ignored for DVW tracking purposes and n is incremented 1134. When bits are not the same, the method includes sampling DVW at PC, F1 and F2 1136 to obtain Actual data at PC 1138, Drift Data at F1 1140 and Drift Data at F2 1142. Data sampled at PC 1138 is compared with drift data sampled at F1 1140 and a left-shift counter (e.g., counter 966) is incremented when a match occurs 1144. Incrementing continues over N cycles 1148. Data sampled at PC 1138 is also compared with drift data sampled at F2 1142 and a right-shift counter (e.g., counter 974) is incremented when a match occurs 1150. Incrementing continues over N cycles 1152.

FIG. 11C (which continues from FIG. 11B at points P2 and P3) includes asserting a left-shift flag if the MSB in the left-shift counter is one 1154 and asserting a right-shift flag if the MSB in the right-shift counter is one 1156. A determination is then made as to whether the left-shift flag is asserted 1158 and a determination is made as to whether the right-shift flag is asserted 1160. If neither flag is asserted, then sampling is unchanged 1162 (e.g., sampling is aligned with DVWs so no change to sampling time is needed). If the left-shift flag is asserted then the method includes shifting PC/F1/F2 to the left 1164 (e.g., as shown in FIG. 6A), sampling data using the shifted sampling pointers and making a determination 1168 made as to whether the data fails ECC decoding. If the data fails ECC decoding then the method includes restoring pointers 1170 (e.g., if adjusted pointers do not provide correctable data, then adjustment is reversed). A determination is made by repetitive checker 1172 as to whether a repetitive checker is to be used 1174 (e.g., whether retrying is enabled). If a repetitive checker is not to be used then the process ends. If repetitive checker is to be used then the process continues with sampling data at PC(n) 1128 (FIG. 11B), which repeats the above steps. If the right-shift flag is asserted 1160 then the method includes shifting PC/F1/F2 to the right 1166 (e.g., as shown in FIG. 6B). A data signal may then be sampled using the shifted sampling pointers and a determination 1169 made as to whether the data fails ECC decoding. If the data fails ECC decoding then the method includes restoring pointers 1171

(e.g., if adjusted pointers do not provide correctable data, then adjustment is reversed). A determination is made by repetitive checker 1172 as to whether repetitive checking is to be used 1174 (e.g., whether retrying is enabled). If repetitive checking is not to be used then the process ends. If repetitive checking is to be used then the process continues with sampling data at PC(n) 1128 (FIG. 11B), which repeats the above steps.

Figure 12A:
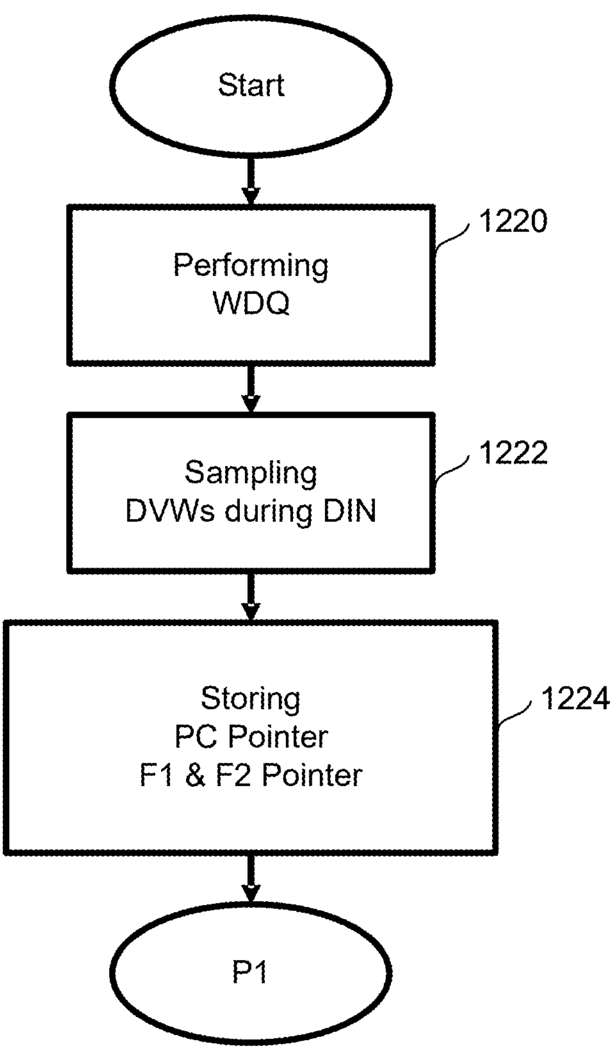
Figure 12B:
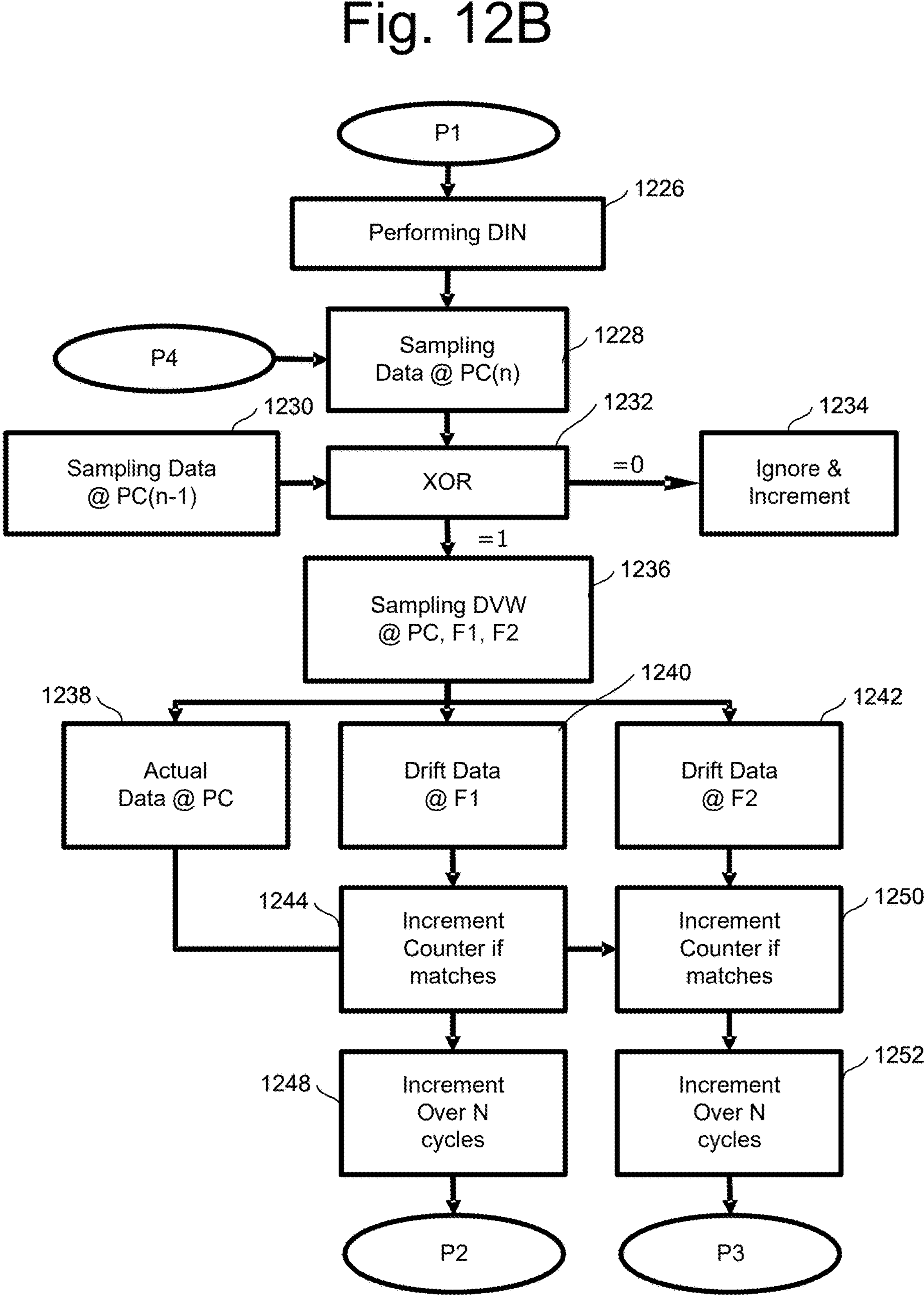
Figure 12C:
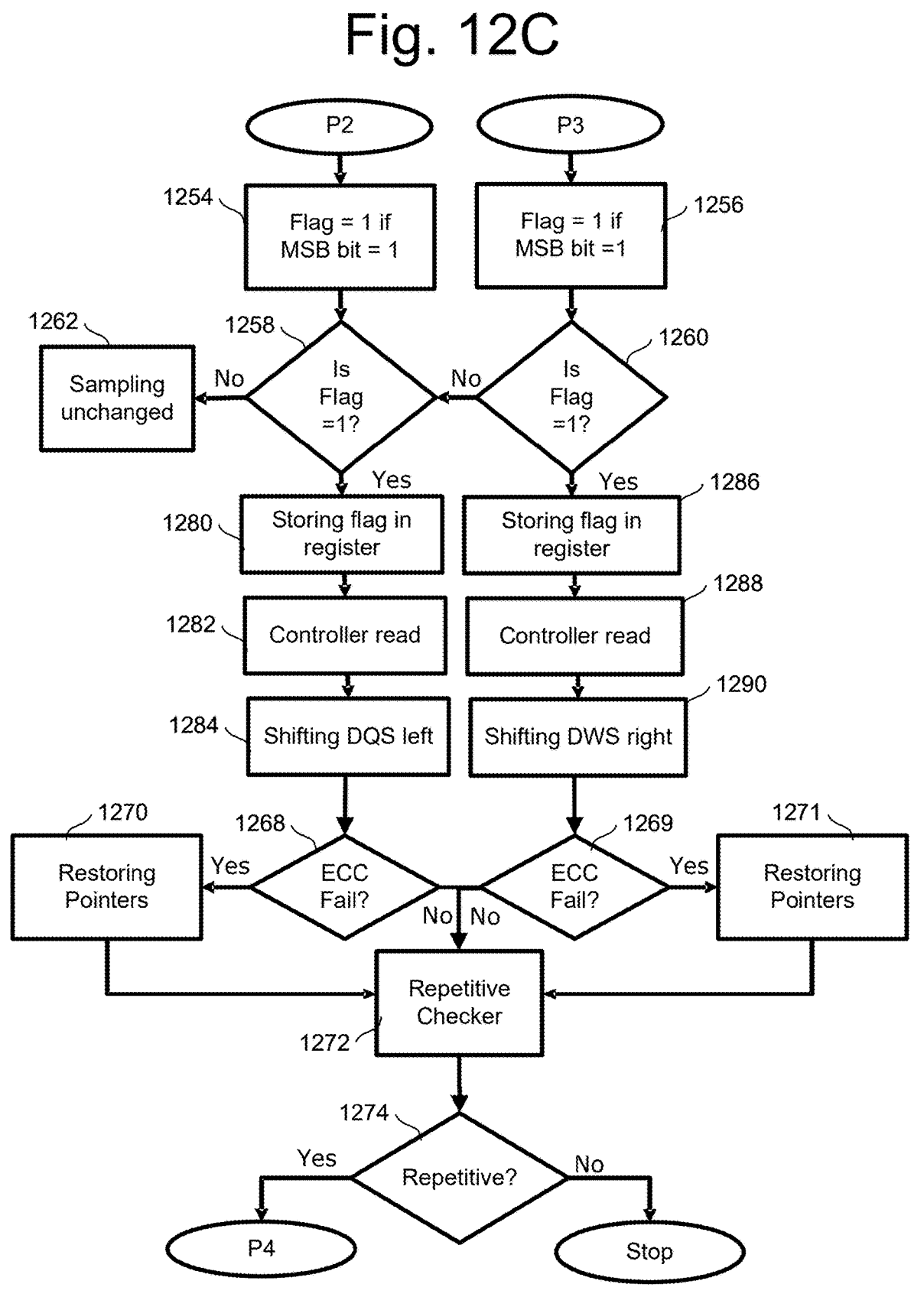

FIGS. 12A-C illustrate an example of a method that may be applied by control circuits of a nonvolatile memory die (e.g., Die0 to Die5) or integrated memory assembly to data from a memory controller die (e.g., DIN from memory controller die 404). The method of FIGS. 12A-C may be implemented, for example, by DVW tracking and adjustment circuits 950*a*, which may be implemented as illustrated in FIG. 9 or otherwise.

FIG. 12A includes performing WDQ 1220 (e.g., receiving a data signal such as a test/training signal from a memory controller), sampling DVWs during DIN 1222 (e.g., as illustrated in FIG. 5 to determine boundaries of DVWs) and storing PC pointer, F1 and F2 pointers 1224. The steps illustrated in FIG. 12A may be performed in an initiation operation (e.g., during power-on after some period without power).

FIG. 12B (which continues from FIG. 12A at point P1) includes performing DIN 1226 (e.g., transferring data from a memory controller die to a nonvolatile memory die), sampling the data at PC(n) 1228 and sampling the data at PC(n−1) 1230. The method further includes performing an XOR operation 1232 to determine if bits are the same (XOR=0) or different (XOR=1). If bits are the same then the transition PC(n−1) to PC(n) is ignored for DVW tracking purposes and n is incremented 1234. When bits are not the same, the method includes sampling DVW at PC, F1 and F2 1236 to obtain Actual data at PC 1238, Drift Data at F1 1240 and Drift Data at F2 1242. Data sampled at PC 1238 is compared with drift data sampled at F1 1240 and a left-shift counter (e.g., counter 966) is incremented when a match occurs 1244. Incrementing continues over N cycles 1248. Data sampled at PC 1238 is also compared with drift data sampled at F2 1242 and a right-shift counter (e.g., counter 974) is incremented when a match occurs 1250. Incrementing continues over N cycles 1252.

FIG. 12C (which continues from FIG. 12B at points P2 and P3) includes asserting a left-shift flag if the MSB in the left-shift counter is one 1254 and asserting a right-shift flag if the MSB in the right-shift counter is one 1256. A determination is then made as to whether the left-shift flag is asserted 1258 and a determination is made as to whether the right-shift flag is asserted 1260. If neither flag is asserted, then sampling is unchanged 1262 (e.g., sampling is aligned with DVWs so no change to sampling time is needed). If the left-shift flag is asserted then the method includes storing the flag in a register 1280 (e.g., registers 1004), performing a controller read 1282 (e.g., memory controller die 404 reads registers 1004) and shifting DQS left 1284 (where shifting DQS causes sampling times to shift by an offset). A data signal may then be sampled using the shifted sampling pointers and a determination 1268 made as to whether the data fails ECC decoding. If the data fails ECC decoding then the method includes restoring pointers 1270 (e.g., if adjusted pointers do not provide correctable data, then adjustment is reversed). A determination is made by repetitive checker 1272 as to whether repetitive checking is to be used 1274 (e.g., whether retrying is enabled). If repetitive checking is not to be used then the process ends. If repetitive checking is to be used then the process continues with sampling data at PC(n) 1228 (FIG. 12B), which repeats the above steps.

If the right-shift flag is asserted then the method includes storing the flag in a register 1286 (e.g., registers 1004), performing a controller read 1288 (e.g., memory controller die 404 reads registers 1004) and shifting DQS right 1290 (where shifting DQS causes sampling times to shift by an offset). A data signal may then be sampled using the shifted sampling pointers and a determination 1269 made as to whether the data fails ECC decoding. If the data fails ECC decoding then the method includes restoring pointers 1271 (e.g., if adjusted pointers do not provide correctable data, then adjustment is reversed). A determination is made by repetitive checker 1272 as to whether repetitive checking is to be used 1274 (e.g., whether retrying is enabled). If repetitive checking is not to be used then the process ends. If repetitive checking is to be used then the process continues with sampling data at PC(n) 1228 (FIG. 12B), which repeats the above steps.

FIG. 13 illustrates an example of a method of Data Valid Window (DVW) tracking. The method includes receiving a data signal 1380, sampling the data signal at a first time on a first side of a DVW to obtain a first bit 1382 (e.g., sampling at F1), sampling the data signal at a second time on a second side of the DVW to obtain a second bit 1384 (e.g., sampling at F2) and sampling the data signal at a third time between the first time and the second time to obtain a center or middle bit 1386 (e.g., sampling at PC). The method further includes comparing the first bit and the middle bit to detect first misalignment of sampling with the DVW 1388 (e.g., left misalignment), comparing the second bit and the middle bit to detect second misalignment of sampling with the DVW 1390 (e.g., right misalignment) and in response to detecting first DVW misalignment or second DVW misalignment, adjusting timing of sampling the data signal 1392 (e.g., applying a positive or negative offset to sampling times PC, F1 and F2).

According to a first set of aspects, an apparatus includes one or more control circuit configured to connect to a data bus. The one or more control circuit is configured to compare a first bit sampled on a first (e.g., left) side of a DVW of a data signal with a middle bit from the middle of the DVW to detect first misalignment of sampling with the DVW (e.g., left shift) and compare a second bit sampled on a second (e.g., right) side of the DVW with the middle bit to detect second misalignment of sampling with the DVW (e.g., right shift). The one or more control circuit is further configured to adjust sampling times for the data signal according to detection of the first or second misalignment.

In one or more example of the above apparatus, the one or more control circuit includes: a first comparator to compare the first bit and the middle bit; a first counter to count first misalignments; a second comparator to compare the second bit and the middle bit; and a second counter to count second misalignments.

In one or more example of the above apparatus, the one or more control circuit is further configured to adjust sampling time in a first sense according to a first number in the first counter and adjust sampling time in a second sense that is opposite to the first sense according to a second number in the second counter.

In one or more example of the above apparatus, the one or more control circuit is further configured to adjust sampling time in the first sense by adding an offset time for sampling of subsequent DVWs and to adjust sampling in the second sense by subtracting the offset time for sampling of subsequent DVWs.

In one or more example of the above apparatus, the one or more control circuit is further configured to compare a first number in the first counter with a second number in the second counter and to generate an error signal if the first and second numbers exceed a threshold.

In one or more example of the above apparatus, for sampling that is aligned with DVWs both the first bit and the second bit are outside the DVW, detecting the first misalignment of sampling with the DVW includes detecting equality of the first bit and the middle bit and detecting the second misalignment of sampling with the DVW includes detecting equality of the second bit and the middle bit.

In one or more example of the above apparatus, for sampling that is aligned with DVWs both the first bit and the second bit are inside the DVW, detecting the first misalignment of sampling with the DVW includes detecting inequality of the first bit and the middle bit and detecting the second misalignment of sampling with the DVW includes detecting inequality of the second bit and the middle bit.

In one or more example of the above apparatus, the one or more control circuit is further configured to detect logic transitions between DVWs and to selectively apply the detection of first and second misalignment of sampling with the DVW to first and second sides of DVWs at which logic transitions are detected.

In one or more example of the above apparatus, the data bus extends between a memory controller die and one or more nonvolatile memory die and the data signal is a data input from the memory controller die to the one or more nonvolatile memory die or a data output from the one or more nonvolatile memory die to the memory controller die.

In one or more example of the above apparatus, the one or more control circuit is located on the memory controller die, the data signal is an output from the one or more nonvolatile memory die to the memory controller die and the one or more nonvolatile memory die includes one or more additional control circuit configured to connect to the data bus, the additional control circuit configured to receive an input data signal from the memory controller die, compare a third bit sampled on a first side of an input DVW of the input data signal with a center bit from the center of the input DVW to detect first misalignment of sampling with the input DVW, compare a fourth bit sampled on a second side of the input DVW with the center bit to detect second misalignment of sampling with the input DVW and adjust sampling times for the input data signal according to detection of the first or second misalignment.

According to another set of aspects, a method includes receiving a data signal; sampling the data signal at a first time on a first side of a DVW to obtain a first bit; sampling the data signal at a second time on a second side of the DVW to obtain a second bit; sampling the data signal at a third time between the first time and the second time to obtain a middle bit; comparing the first bit and the middle bit to detect first misalignment of sampling with the DVW; comparing the second bit and the middle bit to detect second misalignment of sampling with the DVW; and in response to detecting first DVW misalignment or second DVW misalignment, adjusting timing of sampling the data signal.

In one or more example of the above method, the method further includes comparing the middle bit with middle bits from neighboring DVWs to determine that a first logic transition occurs at the first side of the DVW and a second logic transition occurs at the second side of the DVW.

In one or more example of the above method, the method further includes in a training period prior to the first and second times, sampling the data signal at a plurality of times over a period that is longer than the DVW to identify the first time and the second time from transitions at either side of the DVW.

In one or more example of the above method, the first time and the second time are sampling times immediately outside the DVW such that when sampling is aligned with DVWs the first and second bits are different to the middle bit, comparing the first bit and the middle bit to detect first misalignment of sampling with the DVW includes detecting equality of the first bit and the middle bit and comparing the second bit and the middle bit to detect second misalignment of sampling with the DVW includes detecting equality of the second bit and the middle bit.

In one or more example of the above method, the first time and the second time are sampling times immediately inside the DVW such that when sampling is aligned with DVWs the first and second bits are identical to the middle bit, comparing the first bit and the middle bit to detect first misalignment of sampling with the DVW includes detecting inequality of the first bit and the middle bit and comparing the second bit and the middle bit to detect second misalignment of sampling with the DVW includes detecting inequality of the second bit and the middle bit.

In one or more example of the above method, the method further includes counting a first number of occurrences of the first misalignment; counting a second number of occurrences of the second misalignment; in response to the first number exceeding a threshold number, adjusting timing of sampling by a first time offset; and in response to the second number exceeding the threshold number, adjusting timing of sampling the data by a second time offset.

In one or more example of the above method, the method further includes counting a first number of occurrences of the first misalignment; counting a second number of occurrences of the second misalignment; and in response to the first number exceeding a threshold number and the second number exceeding the threshold number, generating an error signal.

In another set of aspects, a system includes a memory controller die; one or more nonvolatile memory dies; a data bus connecting the memory controller die to the one or more nonvolatile memory dies, the data bus configured to convey data signals between the memory controller die and the one or more nonvolatile memory dies; and means for comparing a first bit sampled on a first side of a DVW of a data signal of the data bus with a middle bit from the middle of the DVW to detect first misalignment of sampling with the DVW, comparing a second bit sampled on a second side of the DVW with the middle bit to detect second misalignment of sampling with the DVW and adjusting sampling times for the data signal according to detection of the first or second misalignment.

In one or more example of the above system, the memory controller die is bonded to the one or more nonvolatile memory dies to form an integrated memory assembly.

In one or more example of the above system, the means for comparing and adjusting is located on the memory controller die to perform DVW tracking for data signals output from the one or more nonvolatile memory dies to the memory controller die and the system further includes additional means for comparing located on the one or more nonvolatile memory dies to perform DVW tracking for data signals input to the one or more nonvolatile memory dies from the memory controller die, the additional means for comparing a third bit sampled on a first side of an input DVW of an input signal with a middle bit from the middle of the input DVW to detect first misalignment of sampling with the input DVW, comparing a fourth bit sampled on a second side of the input DVW with the middle bit to detect second misalignment of sampling with the input DVW and adjusting sampling times for the input data signal according to detection of the first or second misalignment in the input data signal.

The foregoing detailed description has been presented for purposes of illustration and description. It is not intended to be exhaustive or to limit the invention to the precise form disclosed. Many modifications and variations are possible in light of the above teachings. The described embodiments were chosen in order to best explain the principles of the technology and its practical application, to thereby enable others skilled in the art to best utilize the technology in various embodiments and with various modifications as are suited to the particular use contemplated. It is intended that the scope of the technology be defined by the claims appended hereto.

What is claimed is:

1. An apparatus, comprising:

one or more control circuit configured to connect to a data bus, the one or more control circuit configured to:

compare a first bit sampled on a first side of a Data Voltage Window (DVW) of a data signal with a middle bit from the middle of the DVW to detect first misalignment of sampling with the DVW, compare a second bit sampled on a second side of the DVW with the middle bit to detect second misalignment of sampling with the DVW and adjust sampling times for the data signal according to detection of the first or second misalignment wherein for sampling that is aligned with DVWs, either the first and second bits are both sampled outside the DVW such that detecting the first misalignment of sampling with the DVW includes detecting equality of the first bit and the middle bit and detecting the second misalignment of sampling with the DVW includes detecting equality of the second bit and the middle bit or both the first and second bits are sampled inside the DVW such that detecting the first misalignment of sampling with the DVW includes detecting inequality of the first bit and the middle bit and detecting the second misalignment of sampling with the DVW includes detecting inequality of the second bit and the middle bit.

2. The apparatus of claim 1, wherein the one or more control circuit includes:

a first comparator to compare the first bit and the middle bit;

a first counter to count first misalignments;

a second comparator to compare the second bit and the middle bit; and a second counter to count second misalignments.

3. The apparatus of claim 2, wherein the one or more control circuit is further configured to adjust sampling time in a first sense according to a first number in the first counter and adjust sampling time in a second sense that is opposite to the first sense according to a second number in the second counter.

4. The apparatus of claim 3, wherein the one or more control circuit is further configured to adjust sampling time in the first sense by adding an offset time for sampling of subsequent DVWs and to adjust sampling in the second sense by subtracting the offset time for sampling of subsequent DVWs.

5. The apparatus of claim 2, wherein the one or more control circuit is further configured to compare a first number in the first counter with a threshold number, compare a second number in the second counter with the threshold number and to generate an error signal if the first and second numbers exceed a threshold.

6. The apparatus of claim 1, wherein the one or more control circuit is further configured to sample the data signal at a plurality of times over a period that is longer than the DVW to identify the first time and the second time from transitions at either side of the DVW.

7. The apparatus of claim 1, wherein the one or more control circuit is further configured to detect logic transitions between DVWs and to selectively apply the detection of first and second misalignment of sampling with the DVW to first and second sides of DVWs at which logic transitions are detected.

8. The apparatus of claim 1, wherein the data bus extends between a memory controller die and one or more nonvolatile memory die and the data signal is a data input from the memory controller die to the one or more nonvolatile memory die or a data output from the one or more nonvolatile memory die to the memory controller die.

9. The apparatus of claim 8, wherein the one or more control circuit is located on the memory controller die, the data signal is an output from the one or more nonvolatile memory die to the memory controller die and the one or more nonvolatile memory die includes one or more additional control circuit configured to connect to the data bus, the additional control circuit configured to receive an input data signal from the memory controller die, compare a third bit sampled on a first side of an input DVW of the input data signal with a center bit from the center of the input DVW to detect first misalignment of sampling with the input DVW, compare a fourth bit sampled on a second side of the input DVW with the center bit to detect second misalignment of sampling with the input DVW and adjust sampling times for the input data signal according to detection of the first or second misalignment.

10. A method of Data Valid Window (DVW) tracking, the method comprising:

in a training period, sampling a training data signal at a plurality of times over a period that is longer than a DVW to identify a first time and a second time for sampling the data signal from transitions at either side of the DVW;

subsequently, receiving a data signal;

sampling the data signal at a first time on a first side of a DVW to obtain a first bit;

sampling the data signal at a second time on a second side of the DVW to obtain a second bit;

sampling the data signal at a third time between the first time and the second time to obtain a middle bit;

comparing the first bit and the middle bit to detect first misalignment of sampling with the DVW;

comparing the second bit and the middle bit to detect second misalignment of sampling with the DVW; and in response to detecting first DVW misalignment or second DVW misalignment, adjusting timing of sampling the data signal.

11. The method of claim 10, further comprising:

comparing the middle bit with middle bits from neighboring DVWs to determine that a first logic transition occurs at the first side of the DVW and a second logic transition occurs at the second side of the DVW.

12. The method of claim 10, wherein the first time and the second time are sampling times immediately outside the DVW such that when sampling is aligned with DVWs the first and second bits are different to the middle bit, comparing the first bit and the middle bit to detect first misalignment of sampling with the DVW includes detecting equality of the first bit and the middle bit and comparing the second bit and the middle bit to detect second misalignment of sampling with the DVW includes detecting equality of the second bit and the middle bit.

13. The method of claim 10, wherein the first time and the second time are sampling times immediately inside the DVW such that when sampling is aligned with DVWs the first and second bits are identical to the middle bit, comparing the first bit and the middle bit to detect first misalignment of sampling with the DVW includes detecting inequality of the first bit and the middle bit and comparing the second bit and the middle bit to detect second misalignment of sampling with the DVW includes detecting inequality of the second bit and the middle bit.

14. The method of claim 10, further comprising:

counting a first number of occurrences of the first misalignment;

counting a second number of occurrences of the second misalignment;

in response to the first number exceeding a threshold number, adjusting timing of sampling by a first time offset; and in response to the second number exceeding the threshold number, adjusting timing of sampling the data signal by a second time offset.

15. The method of claim 10, further comprising:

counting a first number of occurrences of the first misalignment;

counting a second number of occurrences of the second misalignment; and in response to the first number exceeding a threshold number and the second number exceeding the threshold number, generating an error signal.

16. A system comprising:

a memory controller die;

one or more nonvolatile memory dies;

a data bus connecting the memory controller die to the one or more nonvolatile memory dies, the data bus configured to convey data signals between the memory controller die and the one or more nonvolatile memory dies;

means for comparing a first bit sampled on a first side of a DVW of a data signal of the data bus with a middle bit from the middle of the DVW to detect first misalignment of sampling with the DVW, comparing a second bit sampled on a second side of the DVW with the middle bit to detect second misalignment of sampling with the DVW and adjusting sampling times for the data signal according to detection of the first or second misalignment, the means for comparing located on the memory controller die to perform DVW tracking for data signals output from the one or more nonvolatile memory dies to the memory controller die; and additional means for comparing located on the one or more nonvolatile memory dies to perform DVW tracking for data signals input to the one or more nonvolatile memory dies from the memory controller die, the additional means for comparing a third bit sampled on a first side of an input DVW of an input signal with a middle bit from the middle of the input DVW to detect first misalignment of sampling with the input DVW, comparing a fourth bit sampled on a second side of the input DVW with the middle bit to detect second misalignment of sampling with the input DVW and adjusting sampling times for the input data signal according to detection of the first or second misalignment in the input data signal.

17. The system of claim 16, wherein the one or more nonvolatile memory dies is bonded to a control die to form an integrated memory assembly and the means for comparing is located in the control die.

18. The system of claim 16, wherein the one or more nonvolatile memory dies include NAND flash memory cells.

* * * * *